United States Patent
Sakao et al.

(10) Patent No.: US 8,775,158 B2
(45) Date of Patent: Jul. 8, 2014

(54) DATA PROCESSING DEVICE, DATA PROCESSING METHOD, AND DATA PROCESSING PROGRAM

(75) Inventors: Yousuke Sakao, Tokyo (JP); Takahiro Ikeda, Tokyo (JP); Yoshihiro Ikeda, legal representative, Chiba (JP); Kenji Satoh, Tokyo (JP)

(73) Assignee: NEC Corporation, Tokyo (JP)

( * ) Notice: Subject to any disclaimer, the term of this patent is extended or adjusted under 35 U.S.C. 154(b) by 933 days.

(21) Appl. No.: 11/996,484

(22) PCT Filed: Aug. 2, 2006

(86) PCT No.: PCT/JP2006/315274
§ 371 (c)(1),
(2), (4) Date: Jan. 22, 2008

(87) PCT Pub. No.: WO2007/015505
PCT Pub. Date: Feb. 8, 2007

(65) Prior Publication Data
US 2010/0063795 A1 Mar. 11, 2010

(30) Foreign Application Priority Data
Aug. 4, 2005 (JP) .................................. 2005-227283

(51) Int. Cl.
*G06F 17/27* (2006.01)
(52) U.S. Cl.
USPC ............ 704/9; 704/8; 704/7; 704/4; 704/275; 704/272; 704/270.1; 704/2; 704/10; 704/1; 717/146; 715/234; 709/219; 706/50
(58) Field of Classification Search
USPC ........ 704/9, 8, 7, 4, 275, 272, 270.1, 2, 10, 1; 717/146; 715/234; 709/219; 706/50
See application file for complete search history.

(56) References Cited

U.S. PATENT DOCUMENTS 5,424,947 A * 6/1995 Nagao et al. ...................... 704/9
5,590,039 A * 12/1996 Ikeda et al. ...................... 704/9
(Continued)

FOREIGN PATENT DOCUMENTS

JP    6-223109 A    8/1994
JP    2001-84250 A  3/2001
(Continued)

OTHER PUBLICATIONS

Itao, et al., "Tokuchoteki na Imi Naiyo o Chushutsu suru Mokuzo Mining no Tameno Nihongo Shori Shuho", The Association for Natural Language Process Dai 11 Kai Nenji Taikai Happyo Ronbunshu, Mar. 15, 2005, pp. 73-76.

(Continued)

*Primary Examiner* — Michael Colucci
(74) *Attorney, Agent, or Firm* — Sughrue Mion, PLLC

(57) ABSTRACT

[PROBLEMS] To provide a data processing device such as a text mining device capable of extracting characteristic structures properly even in case a plurality of words indicating identical contents or a plurality of words semantically associated are contained in input data. [MEANS FOR SOLVING PROBLEMS] Association node extraction unit (22) of a text mining device (10) extracts association nodes containing semantically associated words from a graph obtained as a result of syntax analysis. Association node joint unit (23) transforms the graph by joint of a part of or a whole of the association nodes. Characteristic structure extraction unit (24) extracts a characteristic structure from the graph transformed by the association node joint unit.

15 Claims, 28 Drawing Sheets

(56) References Cited

U.S. PATENT DOCUMENTS

| | | | |
|---|---|---|---|
| 5,721,938 A * | 2/1998 | Stuckey | 704/4 |
| 5,774,833 A * | 6/1998 | Newman | 704/9 |
| 5,878,385 A * | 3/1999 | Bralich et al. | 704/9 |
| 5,933,822 A * | 8/1999 | Braden-Harder et al. | 1/1 |
| 5,963,940 A * | 10/1999 | Liddy et al. | 1/1 |
| 6,044,347 A * | 3/2000 | Abella et al. | 704/272 |
| 6,343,266 B1 * | 1/2002 | Paul et al. | 704/9 |
| 6,618,725 B1 | 9/2003 | Fukuda et al. | |
| 6,721,706 B1 * | 4/2004 | Strubbe et al. | 704/275 |
| 6,728,679 B1 * | 4/2004 | Strubbe et al. | 704/270.1 |
| 6,795,808 B1 * | 9/2004 | Strubbe et al. | 704/275 |
| 7,027,974 B1 * | 4/2006 | Busch et al. | 704/4 |
| 7,099,855 B1 * | 8/2006 | Nelken et al. | 706/50 |
| 7,197,747 B2 * | 3/2007 | Ishizaki et al. | 717/146 |
| 7,693,705 B1 * | 4/2010 | Jamieson | 704/9 |
| 7,702,500 B2 * | 4/2010 | Blaedow | 704/9 |
| 7,747,701 B2 * | 6/2010 | Yang et al. | 709/219 |
| 8,046,227 B2 * | 10/2011 | Starkie | 704/270.1 |
| 2002/0174147 A1 * | 11/2002 | Wang et al. | 707/513 |
| 2003/0023422 A1 * | 1/2003 | Menezes et al. | 704/2 |
| 2003/0154068 A1 * | 8/2003 | Tokuda et al. | 704/7 |
| 2005/0108001 A1 * | 5/2005 | Aarskog | 704/10 |
| 2005/0240393 A1 * | 10/2005 | Glosson | 704/8 |
| 2006/0004702 A1 * | 1/2006 | St. John et al. | 707/2 |
| 2006/0074634 A1 * | 4/2006 | Gao et al. | 704/9 |
| 2006/0116861 A1 * | 6/2006 | Kaplan et al. | 704/1 |

FOREIGN PATENT DOCUMENTS

| | | |
|---|---|---|
| JP | 2001-134575 A | 5/2001 |
| JP | 2005-11215 A | 1/2005 |

OTHER PUBLICATIONS

Morinaga, et al., "Kobun Graph Shugo o Mochiita Key Semantics Mining (Mining Key Semantics Using Dependency Graphs)", FIT2004 Dai 3 Kai Forum on Information Technology Ippan Koen Ronbunshu separate vol. 2, Aug. 20, 2004, pp. 125-126.

* cited by examiner

FIG. 9

11 (TEXT DB)

TEXT S1: A TYPE OF CAR IS REASONABLE AND WITH HIGH PERFORMANCE.

TEXT S2: A TYPE OF CAR IS REASONABLE. IN ADDITION, IT IS WITH HIGH PERFORMANCE.

TEXT S3: A TYPE OF CAR IS REASONABLE. AT THE SAME TIME, ITS CAR TYPE IS WITH HIGH PERFORMANCE.

DATA PROCESSING DEVICE, DATA PROCESSING METHOD, AND DATA PROCESSING PROGRAM

TECHNICAL FIELD

The present invention relates to data processing such as text mining, text summarization, text search, and text categorization, in which input data such as a computerized text stored in a computer is structuralizing by a unit, such as a parsing unit, so as to be analyzed, in particular, it relates to a data processing device, a data processing method, and a data processing program to transform a graph expressing a structure of the input data obtained by the parsing unit and the like based on a relationship between nodes so as to extract a characteristic structure from the transformed graph.

BACKGROUND ART

Patent Document 1 discloses a structure shown in FIG. 24 as an example of a text mining device. This conventional text mining device includes a basic dictionary storage section, a document data storage section, a field dependent dictionary storage section, a language characteristics analysis device, a language analysis device, a pattern extraction device, and a frequent pattern display device.

The text mining device in FIG. 24 generally operates as follows. Firstly, the language characteristics analysis device creates a field dependent dictionary based on a basic dictionary and document data. Next, the language analysis device creates sentence structures, such as syntax trees at each sentence based on the basic dictionary, the field dependent dictionary, and the document data, where the sentence structure means a graph structure expressing a text obtained by parsing of the text. Next, the pattern extraction device extracts a characteristic structure using the sentence structures, and stores a sentence matching the characteristic structure of the document data in a frequent pattern matching document storage section, at the same time, outputs the characteristic structure, where the characteristic structure means a partial structure characterizing a text collection such as a frequent pattern which is extracted by application of the text mining processing to a partial structure of the sentence structure.
Patent Document 1: JP2001-84250

DISCLOSURE OF THE INVENTION

Problems to be Solved by the Invention

The aforementioned conventional mining device has a problem in which a characteristic structure cannot be extracted properly when there is a plurality of words representing identical contents or having semantic association in a text. The "words representing the identical contents" are, for example, an anaphoric pronoun or a zero pronoun, and an antecedent.

The conventional text mining device is, for example, not capable of text mining identifying a case where a single word is used to describe some concept in one text with a case where a plurality of words (including the zero pronoun and the like omitted in the text) are used to describe the same concept in one text.

This is because the conventional text mining device does not include a unit to identify the case where a single word is used to describe some concept in one text with the case where a plurality of words are used to describe the same concept in one text.

FIG. 25 is an example of sentence structures obtained by parsing of two texts, "Shashu A wa yasukute kouseinou da (A type of car is reasonable and has high performance)" (Text S100) and "Shashu A wa yasui. Shikamo kouseinou da (A type of car is reasonable. In addition, it has high performance)" (Text S101), and characteristic structures extracted from each of the sentence structures to which text mining with related art is applied.

A sentence structure T100 is obtained from the text S100 parsed, and the sentence structure is extracted, as it is, as a characteristic structure PT101 (FIG. 25(a)). A sentence structure T101 and a sentence structure T102 are obtained by parsing the text S101, and a characteristic structure PT101 and a characteristic structure PT102 are extracted as characteristic structures (FIG. 25(b)).

The text S100 uses the single word, "shashu A (A type of car)", on the other hand, the text 5101 uses those two words, "shashu A (A type of car)" and the "zero pronoun" omitted in front of "kouseinou da (has high performance)", in order to describe the same concept, "A type of car is reasonable and has high performance". Therefore, it is desirable that a partial structure PT103 in FIG. 26, which illustrates the concept above, is extracted as the characteristic structure from two of the texts.

However, the structures, the sentence structure T100 of the text S100 describing the concept using the single word, "shashu A", and the sentence structures T101 and T102 of the text 5101 describing the same concept using the antecedent "shashu A" and the "zero pronoun", become different from each other. Consequently, structures of the sentences indicating the same concept cannot be identified using the conventional text mining method, and different characteristic partial structures are extracted.

Further, the conventional text mining device is, for example, not capable of extracting one structure as a whole when one text has a plurality of semantically associated words to describe one concept.

This is because the conventional text mining device does not include a unit for extracting one structure as a whole when one text has a plurality of semantically associated words to describe one concept.

The "semantically associated words" are such as words in a same surface layer, words in a synonymous relationship with each other in a thesaurus, synonyms designated by a user, words associated with each other in a thesaurus like a superordinate concept and a subordinate concept (related words in the thesaurus), and words semantically associated such as related words designated by a user but not representing identical contents. In this regard, the synonyms designated by a user are words designated by the users taking them as a plurality of words capable of indicating the identical contents, and they are determined as the identical words when a characteristic structure such as a frequent pattern is extracted. And the related words designated by a user are words designated by the users taking them as words associated with each other but not necessarily indicating the identical contents.

In FIG. 27, an example is shown in which one structure cannot be extracted as a whole using the related art from one text having a plurality of semantically associated words to describe one concept. FIG. 27 shows examples of sentence structures obtained by parsing of two texts of "Kei jidosha ha ippan ni yasui ga, B-sha no keijidosha ha takai (Minicars are reasonable in general, but minicars of B company are expensive)" (Text 5102) and "Keijidosha ha yasui. B-sha no keijidosha ha takai ga (Minicars are reasonable. Minicars of B company are expensive, though)" (Text S103), and also examples of structures extracted from each of the sentence structures to which text mining with the related art is applied. A sentence structure T103 is obtained when a text S102 is parsed, and a partial structure PT104 and PT105 are extracted as characteristic partial structures (FIG. 27(a)). The sentence structures T104 and T105 are obtained when a text S103 is parsed, and partial structures PT106 and PT107 are extracted as characteristic partial structure (FIG. 27(b)).

Both of the texts describe the general minicars and the minicars of B company comparing them. Therefore, it is desirable that a structure PT108 in FIG. 28, which illustrates the comparison, is extracted as a characteristic structure from two of the texts.

However, the sentence structure T103 of the text S102 does not represent a semantic association between the general minicars and the minicars of B company, so that the existing text mining method cannot extract a single structure as a whole to represent the above comparison. Furthermore, the sentence structure of the text S103 for representing the comparison is separated into the sentence structures T104 and T105, so that the existing text mining method cannot extract a single structure as a whole.

Consequently, there are the associated concept in those two texts written with a plurality of words in the same surface layer of "keijidosha (minicars)", however, the structure having the content representing the general minicars (PT104 and PT106) and the structure having the content representing the minicars of B company (PT105 and PT107) are extracted separately.

So, an object of the present invention is to provide a device, a method, and a program for data processing which capable of extracting a characteristic structure properly even if input data, such as a text, has a plurality of words representing a unique concept, or has a plurality of semantically associated words.

Means of Solving the Problem

A data processing device, according to the present invention, includes an association node extraction unit for extracting association nodes, which includes semantically associated words, from a graph obtained by syntax analysis and the like.

An association node joint unit transforms the graph by joint of a part of or a whole of the association nodes, where "joint" means that a plurality of nodes are joined into a single node, or that a node and another node in the graph are connected by a new branch.

A characteristic structure extraction unit extracts a characteristic structure from the graph transformed by the association node joint unit (claim 1).

According to the above data processing device, the association node joint unit transforms a graph by joint of association nodes. This transformation is performed in accordance with joint of the association nodes including semantically associated words, or with connection of them by a new branch, so that a plurality of partial structures can be linked even if they cannot be recognized a fact in graphs firstly obtained by the syntax analysis that they denote identical contents actually.

Therefore, a characteristic structure can be extracted properly even if input data includes a plurality of words representing identical concepts or semantically associated with each other.

In the above data processing device, the association node joint unit may categorize the association nodes into strong association nodes and weak association nodes in accordance with strength or weakness of their semantic associations, and may join the strong association nodes into a single node (claim 2).

According to the above, a graph can be transformed joining the nodes representing identical contents into a single node. That is, structures can be transformed into a same form, one of the structures has a single word used to write one input data and the other has a plurality of words representing the same concept used to write one input data.

The characteristic structure extraction unit extracts a characteristic structure from the transformed graph, so that it can extract a characteristic structure identifying the case where one input data is written using a single word and the case where one input data is written using a plurality of words representing the same concept (for example, an antecedent and an anaphoric pronoun).

In the above data processing device, the association node joint unit may categorize the association nodes into the strong association nodes and the weak association nodes in accordance with strength or weakness of their semantic associations, and may connect the weak association nodes by a semantic association branch, and besides, the characteristic structure extraction unit may not extract a partial structure of a graph as a characteristic structure in a case where the partial structure includes notes connected to each other by a semantic association branch, in addition, at least one of those nodes is not connected to another node by a dependency branch (claim 3). In this regard, this semantic association branch is distinguished from a branch indicating a dependent relationship in a graph structure during the characteristic structure extraction processing.

According to the above, semantic association nodes are connected to each other by the semantic association branch in order to transform a structure, and thereby a graph can be transformed into a single partial structure as a whole having nodes corresponding to a plurality of semantically associated words used in one input data to describe one concept connected by a semantic association branch. The characteristic structure extraction unit extracts a characteristic structure from the transformed graph as above, so that it can extract one structure as a whole including a concept which is described by a plurality of semantically associated words in one input data.

In the above data processing device, the association node extraction unit may extract anaphoric nodes, which includes a pronoun or a zero pronoun and an antecedent in an anaphoric relationship, as the association nodes, and the association node joint unit may categorize the anaphoric nodes as the strong association nodes (claim 4).

In the above data processing device, the association node extraction unit may extract same surface layer nodes, which includes words in a same surface, as the association nodes, and the association node joint unit may categorize the same surface layer nodes as the weak association nodes (claim 5).

In the above data processing device, the association node extraction unit may extract synonymous nodes, which includes synonymous words in a thesaurus, as the association nodes, and the association node joint unit may categorize the synonymous nodes as the weak association nodes (claim 6).

In the above data processing device, the association node extraction unit may extract designated synonymous nodes, which includes synonyms designated by a user, as the association nodes, and the association node joint unit may categorize the designated synonymous nodes as the weak association node (claim 7).

In the above data processing device, the association node extraction unit may extract related word nodes, which includes words related with each other in a thesaurus, as the association nodes, and the association node joint unit may categorize the related word nodes as the weak association nodes (claim 8).

In the above data processing device, the association node extraction unit may extract designated related word nodes, which includes related words designated by a user, as the association nodes, and the association node joint unit may categorize the designated related word nodes as the weak association nodes (claims 9).

In the above data processing device, the semantic association calculation unit may calculate a semantic association level which indicates strength or weakness of a semantic association of words included in the association nodes, and the association node joint unit may categorize the association nodes into the strong association nodes and the weak association nodes based on the semantic association level (claim 10).

According to the above, the strong association nodes and the weak association nodes can be sorted out based on a quantitative indication.

In the above data processing device, the association node joint unit may categorize the association nodes in a semantic association level under a first threshold as the weak association nodes, and may categorize the association nodes in a semantic association level is equal to the first threshold or more as the strong association nodes (claim 11).

Moreover, it may not join association nodes in a semantic association level under a second threshold (which is smaller than the first threshold) (claim 12).

According to the above, the thresholds can be determined appropriately in response to a sort of input data which is an object or a target of data processing such as mining, so that operation of the association node joint unit can be coordinated, and a characteristic structure extracted by the characteristic structure extraction unit can be also adjusted.

According to a data processing method of the present invention, association nodes, which are nodes semantically associated, are extracted from nodes of a graph expressing a sentence structure, the graph is transformed in accordance with a part of or a whole of the association nodes joint, and a characteristic structure is extract from the transformed graph (claim 13).

According to the above data processing method, the association nodes are joined to transform the graph. This transformation is led by joint of the association node including semantically associated words, or led by connection of them by a new branch, so that a plurality of partial structures can be linked with each other even if they cannot be recognized in the first graph obtained by the syntax analysis that they represents identical concepts actually.

Therefore, a characteristic structure can be extracted appropriately even if input data includes a plurality of words representing identical contents or semantically associated.

A data processing program, according to the present invention, makes a computer execute a step of extracting association nodes, which are nodes semantically associated with each other, from nodes of a graph expressing a structure of input data, a step of transforming the graph in accordance with joint of a part of or a whole of the association nodes, and a step of extracting a characteristic structure from the transformed graph (claim 14).

The above data processing program makes a computer execute a step of transforming the graph in accordance with joint of the association nodes. This transformation is led by joint of the association nodes including words semantically associated, or by connection of them by a new branch, so that a plurality of partial structures can be linked with each other even if they cannot be recognized in the first graph obtained by syntax analysis that they represent identical concepts actually.

Therefore, a characteristic structure can be extracted properly even if a plurality of words representing identical contents or semantically associated with each other is included in input data.

Advantageous Effect of the Invention

According to the data processing device and the like of the present invention, the association node extraction unit extracts nodes semantically associated as the association nodes, and the association node joint unit joins the association nodes so as to transform a graph which is obtained by analysis of input data targeted for data processing such as mining. The characteristic structure extraction unit extracts a characteristic structure from the transformed graph.

Therefore, the characteristic structure can be extracted properly even if a plurality of words representing identical contents or semantically associated with each other is included in the target input data for data processing.

BEST MODES FOR CARRYING OUT THE INVENTION

Next, a construction and operation of a text mining device 10 in a first exemplary embodiment of the present invention will be described with reference to drawings.
(Construction of the Text Mining Device 10)

FIG. 1 is a functional block diagram showing construction of the text mining device 10.

The text mining device 10 is constructed with a personal computer and the like, and includes a storage device 1 for storing information, a data processing device 2 which operates with program control, and an output device 3 for showing a detected partial structure. The storage device 1 has a text database (DB) 11. The text DB 11 stores a collection of texts targeted for text mining.

The data processing device 2 includes a language analysis unit 21, an association node extraction unit 22, an association node joint unit 23, and a characteristic structure extraction unit 24.

The language analysis unit 21 reads in the text collection in the text DB 11 and generates a sentence structure by analyzing each text of the collection.

The association node extraction unit 22 extracts nodes semantically associated with each other (association nodes) from each of the sentence structures in the collection of sentence structures transmitted from the language analysis unit 21. The semantically associated nodes are, for example, nodes in an anaphoric relationship between a pronoun or a zero pronoun and an antecedent, nodes in a same surface layer, nodes in a synonymous relationship in a thesaurus, nodes in a synonymous relationship designated by a user, nodes in a relationship of related words in a thesaurus, and nodes in a relationship of related words designated by a user.

In this regard, the association nodes are extracted with a well-known technique such as reference resolution, pattern matching for surfaces of two segments, pattern matching between a surface of a synonyms or a related word designated by a user and a surface of a segment, and pattern matching of a word in a thesaurus and a surface of a segment.

The association node joint unit 23 receives information on the collection of sentence structures and the association nodes from the association node extraction unit 22, and transforms each of the sentence structures.

For example, the association node joint unit 23 receives information on a sentence structure collection and association nodes from the association node extraction unit 22, and joins nodes associated with each other in each of the sentence structures into one node so as to transform each sentence structure.

Another example is that the association node joint unit 23 receives information on a sentence structure collection and association nodes from the association node extraction unit 22, and connects nodes semantically associated with each other in each of the sentence structures using a semantic association branch so as to transform each sentence structure.

Yet another example is that the association node joint unit 23 receives information on a sentence structure collection and association nodes from the association node extraction unit 22, and categorizes relationships between the extracted association nodes in each sentence structure. For example, it categorizes them into two types; one is in a case where a plurality of nodes extracted as the association nodes indicates identical contents (strong association nodes), and the other is in a case where a plurality of nodes extracted as the association nodes are semantically associated with each other, however, they do not always indicate identical contents (weak association nodes).

With respect to the strong association nodes, nodes associated with each other are joined into one node, and with respect to the weak association nodes, nodes associated with each other are connected by a semantic association branch.

The following is an example to categorize the association nodes into the strong association nodes and the weak association nodes.

A node of an anaphoric pronoun or a zero pronoun and a node of an antecedent are to be the strong association nodes.

Nodes in a same surface, nodes in a synonymous relationship within a thesaurus, nodes in a synonymous relationship designated by a user, nodes in a relationship of related words within a thesaurus, and nodes in a relationship of related words designated by a user are to be the weak association nodes.

Further, when nodes A, B, and C are in a sentence structure in which the nodes A and B are the association nodes and nodes B and C are the association nodes, the nodes A and C may also be the association nodes. When the nodes A and B are the strong association nodes and the nodes B and C are the strong association nodes, the nodes A and C are categorized, for example, as the strong association nodes, on the other hand, when cases are other than the above, the nodes A and C are categorized as the weak association nodes.

There is a case where plural sets of the strong association nodes to be joined into one node are extracted from a sentence structure, in addition, some node is included in the plurality of the strong association node sets. FIG. 2 shows a sentence structure of a text, "Shashu A ha yasui. Kore ha hayai. Kore ha ninki da (A type of car is reasonable. This is fast. This is popular)" (Text S20) as an example of the above case. Structures T20-A, T20-B, T20-C are obtained from the text S20. In this regard, in order to distinguish two of nodes, "Kore (this)", in FIG. 2, these nodes are shown with suffixes A and B in order of appearance in the Text S20.

In a case where a node of an anaphoric pronoun or zero pronoun and a node of an antecedent are joined into one node by the association node joint unit 23, each of sets in FIG. 2, "shashu A (A type of car)" and "kore (this)" (suffix A), "shashu A (A type of car)" and "kore (this)" (suffix B) is a set of association nodes to be joined into a single node, and "shashu A (A type of car)" is included in both of the sets.

In such a case, for example, all association nodes may be joined into one node (method 1), or a node, in which one set of association nodes are joined, may be generated as many as the association node sets (method 2).

FIG. 3 shows a sentence structure T21 which is a result of application of the method 1 to the sentence structures in FIG. 2 so as to join those association nodes. In the structure T21, those three nodes of "shashu A (A type of car)", "kore (this)" (suffix A), and "kore (this)" (suffix B) in FIG. 2 are joined into one node resulting in a node "shashu A (A type of car)" in FIG. 3.

FIG. 4 shows a sentence structure T22 which is a result of application of the method 2 to the sentence structures in FIG. 2. In the structure T22, the nodes "shashu A (A type of car)" and "kore (this)" (suffix A) in FIG. 2 are joined into one node resulting in a node "shashu A (A type of car)" (suffix A) in FIG. 4. At the same time, the nodes "shashu A (A type of car)" and "kore (this)" (suffix B) in FIG. 2 are joined into one node resulting in a node "shashu A (A type of car)" (suffix B) in FIG. 4.

In this regard, branches connecting each node in FIG. 4 are normal branches illustrating dependency.

Further, there is a case where plural sets of the weak association nodes to be connected by semantic association branches are extracted from a sentence structure, in addition, some node are included in the plurality of the weak association node sets. FIG. 5 shows a sentence structure T23 of a text, "Kanto no shashu to Kansai no shashu to Chubu no shashu no hikaku (a comparison between car types of Kanto area, Kansai area, and Chubu area)" (test S21) as an example of the above case. In this regard, in order to distinguish three of nodes "shashu (car type)" in T23, these nodes are shown with suffixes A, B, and C in order of appearance in text S21. In a case where nodes in a relationship of a same surface are connected by the association node joint unit 23 using a semantic association branch, those sets of the nodes, "shashu (car type)" (suffix A) and "shashu (car type)" (suffix B), "shashu (car type)" (suffix A) and "shashu (car type)" (suffix C), and "shashu (car type)" (suffix B) and "shashu (car type)" (suffix C) in T23 are the weak association nodes to be connected by semantic association branches within each set, and "shashu (car type)" (suffix A), "shashu (car type)" (suffix B), "shashu (car type)" (suffix C) are included in the plurality of weak association node sets respectively.

For the above case, there is a method, for example, for connecting association nodes by a semantic association branch in all of the association node sets (method 3).

Furthermore, each node included in a plurality of association node sets may be connected by a semantic association branch with a node corresponding to a closest segment in a text among the association nodes (method 4). When there is a plurality of nodes corresponding to the closest segment in the text, among the association nodes, all of the nodes are connected by the semantic association branch.

FIG. 6 shows a sentence structure T24 which is a result of connection between the association nodes caused by application of the method 3 to the sentence structure T23 in FIG. 5. Dotted lines in the sentence structure T24 of FIG. 6 illustrate semantic association branches. All of those three association nodes in FIG. 5, "shashu (car type)" (suffix A) and "shashu (car type)" (suffix B), "shashu (car type)" (suffix A) and "shashu (car type)" (suffix C), and "shashu (car type)" (suffix B) and "shashu (car type)" (suffix C) are connected by the semantic association branches resulting in the sentence structure T24.

FIG. 7 shows a sentence structure T25 which is a result of connection between the association nodes caused by application of the method 4 to the sentence structure T23 in FIG. 5. Dotted lines in the sentence structure T25 of FIG. 7 illustrate semantic association branches.

The node "shashu (car type)" (suffix A) in FIG. 7 is connected by the semantic association branch with "shashu (car type)" (suffix B), which is the node corresponding to the closest segment, out of those two association nodes "shashu (car type)" (suffix B) and "shashu (car type)" (suffix C).

The node "shashu (car type)" (suffix B) in FIG. 7 attempts to be connected with two of the association nodes "shashu (car type)" (suffix A) and "shashu (car type)" (suffix C) by the semantic association branch because these are in a same distance therefrom, however, "shashu (car type)" (suffix A) and "shashu (car type)" (suffix B) are already connected with each other by the semantic association branch, and thereby only "shashu (car type)" (suffix B) and "shashu (car type)" (suffix C) get connected with each other by the semantic association branch.

The node "shashu (car type)" (suffix C) in FIG. 7 attempts to be connected by the semantic association branch with "shashu (car type)" (suffix B), which corresponds to the closest segment, out of those two association nodes "shashu (car type)" (suffix A) and "shashu (car type)" (suffix B), however, "shashu (car type)" (suffix B) and "shashu (car type)" (suffix C) are already connected by the semantic association branch with each other, and thereby there is no change.

According to the above, "shashu (car type)" (suffix A), "shashu (car type)" (suffix B), and "shashu (car type)" (suffix C) in FIG. 5 are connected respectively by those semantic association branches, which results in the sentence structure T25 in FIG. 7.

The characteristic structure extraction unit 24 extracts a characteristic partial structure from a collection of sentence structures transformed by the connection of the association nodes sent by the association node joint unit 23, and transmits it to the output device 3. However, the characteristic structure extraction unit 24 does not extract a structure in which at least one of nodes connected by the semantic association branch depending on the association node joint unit 23 does not connected with any other nodes by a dependency branch as a characteristic structure.

(Operation of the Text Mining Device 10)

FIG. 8 is a flowchart showing operation of the text mining device 10.

Firstly, the language analysis unit 21 reads in a text collection in the text DB 11. The language analysis unit 21 analyzes each text of the text collection, and generates sentence structures as analysis results, and then transmits them to the association node extraction unit 22 (Step A1 in FIG. 8).

The association node extraction unit 22 extracts nodes associated with each other from each of those sentence structures in the given sentence structure collection, and transmits information on the sentence structure collection and those association nodes of each sentence structure to the association node joint unit 23 (Step A2 in FIG. 8: an association node extraction step).

The association node joint unit 23 joins nodes associated with each other in those respective sentence structures based on information about the given collection of sentence structures and those association nodes of each sentence structure so as to transform each of the sentence structures in the sentence structure collection, and transmits the structure collection obtained by the transformation to the characteristic structure extraction unit 24 (Step A3 in FIG. 8: an association node joint step).

The characteristic structure extraction unit 24 extracts a characteristic partial structure from the collection of sentence structures transformed by joint of those given association nodes (Step A4 in FIG. 8: a characteristic structure extraction step).

Finally, the characteristic structure extraction unit 24 outputs the extracted characteristic structure to the output device 3 (Step A5 in FIG. 8).

Next, a specific example of operation will be described for the text mining device 10.

In this operation example, the association node extraction unit 22 extracts an antecedent and a pronoun or a zero pronoun in the anaphoric relationship as the association nodes, and the association node joint unit 23 joins those association nodes into one node so as to transform a sentence structure.

Texts S1-S3 in FIG. 9 are a part of a text collection stored in the text DB 11 in FIG. 1.

The language analysis unit 21 parses each of the texts in FIG. 9 so as to obtain sentence structures of each text (Step A1 in FIG. 8). FIG. 10 shows sentence structures obtained in accordance with the parsing by the language analysis unit 21. A sentence structure of the text S1 in FIG. 9 is a structure T1 in FIG. 10, sentence structures of the text S2 in FIG. 9 are structures T2-A and T2-B in FIG. 10, and sentence structures of the text S3 in FIG. 9 are structures T3-A and T3-B in FIG. 10. In this regard, a parallel processing is applied to the structure T1 in FIG. 10 by the language analysis unit 21, and a zero pronoun extraction processing is applied to the structure T2-B in FIG. 10 by the language analysis unit 21.

The association node extraction unit 22 extracts semantically associated nodes from each sentence structure shown in FIG. 10 (Step A2 in FIG. 8). In the exemplary embodiment, two sets are extracted respectively as association nodes, "shashu A(A type of car)" of the structure T2-A and "(zero pronoun)" of the structure T2-B in the anaphoric relationship of an antecedent and a pronoun, and also "shashu A (A type of car)" of the structure T3-A and "sono (its)", "shashu (car type)" of the structure T3-B in the anaphoric relationship of an antecedent and pronouns (one node corresponds to two nodes).

The association node joint unit 23 transforms a sentence structure in accordance with joint of those association nodes based on information about those association nodes extracted by the association node extraction unit 22 from each sentence structure in the sentence structure collection shown in FIG. 10 (Step A3 in FIG. 8). FIG. 11 shows transformed structures obtained by the association node joint unit 23.

The structure T1 in FIG. 10 does not have association node, so that it is not transformed particularly and becomes a structure T1' in FIG. 11.

The structures T2-A and T2-B in FIG. 10 have association nodes "shashu A (A type of car)" of T2-A and "(zero pronoun)" of T2-B, which corresponds to an antecedent and a zero pronoun in the anaphoric relationship, so that those nodes are joined into one node, and the structures T2-A and T2-B in FIG. 10 are united into structure T2' in FIG. 11.

The structures T3-A and T3-B in FIG. 10 has association nodes "shashu A (A type of car)" of T3-A and "sono (its)", "shashu (car type)" of T3-B, which corresponds to an antecedent and a pronoun in the anaphoric relationship, so that those nodes are joined into one node, and the structures T3-A and T3-B in FIG. 10 are united into a structure T3' in FIG. 11.

The characteristic structure extraction unit 24 extracts a characteristic structure from the collection of transformed sentence structures shown in FIG. 11 (Step A4 in FIG. 8), where a partial structure appearing three times or more is extracted as the characteristic structure. Referring to FIG. 11, partial structures appearing frequently are extracted to be structures between PT1 and PT6.

Those nodes of a pronoun, a zero pronoun and an antecedent in the anaphoric relationship are joined into one node to transform structures as above, and a unique concept written with the plurality of words representing identical contents in the texts S2 and S3 in FIG. 9 can be formed into one structure, which can result in extraction of the frequent partial structure TP6 in FIG. 12.

With respect to the sentence structure of the text S1 in FIG. 9, which describes one concept, "Shashu A ha yasuku kouseinou da (A type of car is reasonable and with high performance)", using the single word, "shashu A (A type of car)", the concept thereof is formed in one partial structure T1. On the other hand, with respect to the texts S2 and S3 in FIG. 9, which describe the same concept, "Shashu A ha yasuku kouseinou da (A type of car is reasonable and with high performance)", using the plurality of words representing the identical contents, the concept thereof are divided into the plurality of partial structures. Accordingly, an existing text mining device cannot perform text mining determining them as identical structures.

However, according to the text mining device 10, the association node joint unit 23 joins those association nodes, so that the concepts of the texts between S1 and S3, "Shashu A ha yasuku kouseinou da (A type of car is reasonable and with high performance)", are formed into the same partial structures (the frequent partial structure 6 in FIG. 12), and text mining can be performed identifying them.

Next, a second specific example with respect to operation of the text mining device 10 will be explained.

In this example, the association node extraction unit 22 extracts nodes in a same surface, nodes in a synonymous relationship designated by a user, and nodes in a relationship of related words designated by a user as association nodes. The association node joint unit 23 connects those association nodes by a semantic association branch in order to transform a sentence structure.

Further, "keijidosha (minicars)" and "kei (mini)" are designated by a user as synonyms, and "jidosha (cars)" and "shashu C (C type of cars)", also "jidosha (cars)" and "keijidosha (minicars)" are designated by the user as related words. In order to perform the designation above, a file defining synonyms and related words is created in the storage device 11 in advance.

The related words designated by a user are handled as words which are semantically related with each other, however, which do not represent identical contents necessarily.

Texts from S4 to S9 shown in FIG. 13 are a part of a text collection stored in the text DB 11 in FIG. 1.

The language analysis unit 21 parses each text in FIG. 13 to obtain sentence structures of each text (Step A1 in FIG. 8). FIG. 14 shows sentence structures obtained by the analyses of the language analysis unit 21. A sentence structure of the text S4 in FIG. 13 is a structure T4 in FIG. 14. Sentence structures of the text S5 in FIG. 13 are structures T5-A and T5-B in FIG. 14. Sentence structures of the text S6 in FIG. 13 are structures T6-A and T6-B in FIG. 14. A sentence structure of the text S7 in FIG. 13 is a structure T7 in FIG. 14. Sentence structures of the text S8 in FIG. 13 are structures T8-A and T8-B in FIG. 14. Sentence structures of the text S9 in FIG. 13 are structures T9-A and T9-B in FIG. 14.

The association node extraction unit 22 extracts semantically associated nodes from each sentence structure shown in FIG. 14 (Step A2 in FIG. 8).

Two of "keijidosha (minicars)"s of the structure T4 in a same surface are extracted as association nodes from the text S4.

"keijidosha (minicars)" of the structure T5-A and "keijidosha (minicars)" of the structure T5-B in a same surface are extracted as association nodes from the text S5.

"keijidosha (minicars)" of the structure T6-A and "kei (mini)" of the structure T6-B in a synonymous relationship designated by a user are extracted as association nodes from the text S6.

"jidosha (cars)" and "shashu C (C type of cars)" of the structure T7 in a relationship of related words designated by the user are extracted as association nodes from the text S7.

"jidosha (cars)" of the structure T8-A and "shashu C (C type of cars)" of the structure T8-B in the relationship of related words designated by the user are extracted as association nodes from the text S8.

"jidosha (cars)" of the text T9-A and "shashu C (C type of cars)" of the text T9-B in the relationship of related words designated by the user are extracted as association nodes from the text S9.

The association node joint unit 23 transforms each sentence structure in the collection of sentence structures shown in FIG. 14 in accordance with joint of those association nodes, based on information about those association nodes extracted by the association node extract unit 22 (Step A3 in FIG. 8).

FIG. 15 shows transformed sentence structures obtained by the processing of the association node joint unit 23.

In the structure T4 of FIG. 14, two of those association nodes, "keijidosha (minicars)"s, are in the same surface, so that these nodes are connected by a semantic association branch (illustrated by dotted line in FIG. 15), which results in a structure T4' in FIG. 15. In this regard, this semantic association branch is distinguished from a branch indicating a dependent relationship in a sentence structure when a characteristic structure is extracted.

In the structures T5-A and T5-B of FIG. 14, those association nodes, "keijidosha (minicars)" of the structure T5-A and "keijidosha (minicars)" of the structure T5-B are in the same surface, so that these nodes are connected by a semantic association branch, and the structures T5-A and T5-B in FIG. 14 are united into a structure T5' in FIG. 15.

In the structures T6-A and T6-B in FIG. 14, those association nodes, "keijidosha (minicars)" of the structure T6-A and "kei (mini)" of the structure T6-B are in the synonymous relationship designated by the user, so that these nodes are connected by a semantic association branch, and the structures T6-A and T6-B in FIG. 14 are united into a structure T6' in FIG. 15.

In the structure T7 in FIG. 14, those association nodes, "jidosha (cars)" and "shashu C (C type of cars)" are in the relationship of related words designated by the user, so that these nodes are connected by a semantic association branch, which results in a structure T7' in FIG. 15.

In the structures T8-A and T8-B in FIG. 14, those association nodes, "jidosha (cars)" of the structure T8-A and "shashu C (C type of cars)" of the structure T8-C are in the relationship of related words designated by the user, so that these nodes are connected by a semantic association branch, which results in a structure T8' in FIG. 15.

In the structures T9-A and T9-B in FIG. 14, those association nodes "jidosha (cars)" of the structure T9-A and "shashu C (C type of cars)" of the structure T9-B are in the relationship of related words designated by the user, so that these nodes are connected by a semantic association branch, which results in a structure T9' in FIG. 15.

The characteristic structure extraction unit 24 extracts a characteristic structure from the collection of transformed sentence structures shown in FIG. 15 (Step A4 in FIG. 8). In this regard, a structure is unnecessary when at least one of two nodes connected by a semantic association branch introduced by the association node joint unit 23 is not connected to any other node by a dependency branch, so that it is not extracted as a characteristic structure.

FIG. 16 shows an example of such a structure. In T26 of FIG. 16, one of two "keijidosha (minicars)" nodes (left in the drawing) in a comparative relationship with each other is not connected to another node by a dependency branch, and thereby this structure is unnecessary.

Excluding the above kind of structures, a partial structure appearing three times or more is extracted as a characteristic structure. Referring to FIG. 15, paying attention at a same time to a case where "keijidosha (minicars)" and "kei (mini)" are handled as identical words depending on the synonyms designated by the user, extracted frequent partial structures are to be frequent partial structures from PT7 to PT23 in FIG. 17.

Finally, the characteristic structures extracted as above are outputted to the output device 3 (Step A5 in FIG. 2).

According to the above, nodes in the same surface, or nodes in the synonymous relationship designated by a user are connected by the semantic association branch with each other, which leads to a single structure as a whole having contents written separately using a plurality of semantically associated words in the texts S4, S5, S6, as well as the texts S7, S8, S9 in FIG. 13, and frequent partial structures, PT14, 15, 16, and 23 in FIG. 17 can be extracted.

The plurality of semantically associated words are used for describing the concept in which the general minicars and the minicars of B company are compared in the texts S4, S5, S6 in FIG. 13, and the concept in which the general cars and the C type of cars are compared in the texts S7, S8, S9, so that these concepts are extracted separately as a plurality of partial structures when the existing text mining method is applied, and thereby results of the text mining do not indicate the comparison between those pairs.

According to this operation example, the association node joint unit 23 transforms sentence structures connecting the weak association nodes by the semantic association branch to generate one partial structure as a whole. The characteristic node extraction unit 24 extracts a characteristic partial structure from a transformed sentence structure, such as the sentence structure T4' (FIG. 15), so that the characteristic partial structure PT14 (FIG. 17) and the like, which cannot be extracted by the existing text mining device, can be extracted.

Further, according to the exemplary embodiment, a structure such as T27 in FIG. 18, which is generated by joint of semantically associated nodes in sentence structures of different texts, is not extracted as a characteristic structure. When semantically associated nodes are joined after extracting a characteristic structure, the node "keijidosha (minicars)" of the frequent partial structure PT13 and the node "jidosha (cars)" of the frequent partial structure PT21 are connected out of those partial structures shown in FIG. 17 by the semantic association branch, and the structure T27 in FIG. 18 is generated.

However, a text actually describing comparison between the general cars and the minicars of B company, illustrated by the structure T27, does not exist in the input text collection shown in FIG. 13. Therefore, it is not desirable that the structure T27 is extracted as a characteristic structure.

According to the text mining device 10, a wrong characteristic structure is not extracted, unlike the above case, because semantically associated nodes, of which sentence structures are in different texts with each other, are not joined, which is different from a method for joining semantically associated nodes after extracting a characteristic structure.

Next, a construction and operation of a text mining device 30, which is a second exemplary embodiment of the present invention, will be described with reference to the drawings. The text mining device 30 has a lot of parts in common with the text mining device 10, therefore, same parts between the text mining devices 10 and 30 have the same numerals so as to omit explanations therefor.

(Construction of the Text Mining Device 30)

FIG. 19 is a functional block diagram showing a construction of the text mining device 30.

The text mining device 30 includes an input device 5 which is not included in the text mining device 10 in FIG. 1. Further, the data processing device 4 has a unit of association node joint by association level (association node joint unit) 26 instead of the association node joint unit 23 of the data processing device 2 in FIG. 1, also has a semantic association level calculation unit 25 which is not included in the data processing device 2.

The semantic association level calculation unit 25 receives information on association nodes in each sentence structure from the association node extraction unit 22, and calculates semantically associated levels between associated nodes, and then transmits information on semantic association level of those association nodes in each sentence structure to the unit 26 of association node joint by association level. The semantic association level is an indication for semantic association between association nodes, and is calculated depending on combination of parameters, for example, association nodes indicating identical contents or not, a distance in a thesaurus between association nodes in a relationship of related words in the thesaurus, and a distance in a text between segments corresponding to association nodes.

Further, when nodes A, B, and C are in a sentence structure in which the nodes A and B, as well as the nodes B and C are association nodes with each other, in addition, in which the nodes A and C are to be association nodes with each other, the semantic association level of the association nodes A and C can be obtained based on the semantic association level of the nodes A and B, also the nodes B and C.

The input device 5 receives a threshold as an input to categorize association nodes in accordance with the semantic association level of association nodes, for example two of thresholds, a threshold A (a second threshold) and a threshold B (a first threshold), to transmit to the unit 26 of association node joint by association level. In this regard, a value of the threshold B is always required to be equal to a value of the threshold A or more.

The unit 26 of association node joint by association level receives information on a collection of sentence structures, association nodes, and semantic association levels of these association nodes from the semantic association level calculation unit 25, in addition, it receives the thresholds A and B from the input device 5, and joins those association nodes as follows in accordance with magnitude relation among a value of the semantic association level of associated nodes with each other, and the thresholds A and B so as to transform each sentence structure.

When a value of the semantic association level is less than the threshold A, a structure of those association nodes are not transformed.

When a value of the semantic association level is equal to the threshold A or more, at the same time, it is less than the threshold B, those association nodes are connected by a semantic association branch.

When a value of the semantic association level is equal to the threshold B or more, those association nodes are joined into a single node.

Further, when the input device 5 inputs only one threshold (which is referred to as a threshold C), the unit 26 of association node joint by association level joins association nodes as follows in accordance with magnitude relation among a value of the semantic association level of nodes associated with each other and the threshold C to transform each sentence structure.

When a value of the semantic association level is less than the threshold C, a structure of those association nodes are not transformed.

When a value of the semantic association level is equal to the threshold or more, those association nodes are joined into a single node.

When two of inputted thresholds have a same value, the above process is applied.

(Operation of the Text Mining Device 30)

FIG. 20 is a flowchart for describing operation of the text mining device 30.

Points different from the text mining device 10 are that Step B3 is performed instead of Step A3 in FIG. 8, and Steps B1 and B2 are inserted between Steps A2 and B3. Processes indicated as Steps A1, A2, A4, and A5 in FIG. 20 are same as the processes of the text mining device 10, so that explanations thereof will be omitted.

With respect to the text mining device 10, the association node joint unit 23 joins association nodes with the joint method determined in advance. On the other hand, with respect to the text mining device 30, association nodes are joined in accordance with the semantic association levels calculated by the semantic association level calculation unit 25.

The semantic association level calculation unit 25 receives information on association nodes in each sentence structure from the association node extraction unit 22, and calculates a semantic association level of those node associated with each other, then transmits information on the semantic association level of association nodes in each sentence structure to the unit 26 of association node joint by association level (Step B1 in FIG. 20).

The input device 5 receives two of thresholds, the thresholds A and B, as an input to categorize association nodes in accordance with the semantic association level of association nodes, and transmits them to the unit 26 of association node joint by association level (Step B2 in FIG. 20). In this regard, Step B2 may be performed anytime before Step A4, not limited to the timing shown in FIG. 20.

The unit 26 of association node joint by association level receives information on a collection of sentence structures, association nodes, and semantic association levels of those association nodes from the semantic association level calculation unit 25, in addition, it receives the thresholds A and B from the input device 5, and then transforms each sentence structure by joint of those association nodes in accordance with magnitude relation among the value of the semantic association level of those association nodes, the thresholds A and B (Step B3 in FIG. 20).

According to the text mining device 10 above, the association node joint unit 23 joins association nodes in sentence structures extracted by the association node extraction unit 22 for transformation, and then the characteristic structure extraction unit 24 extracts a characteristic structure.

Therefore, cases can be identified to perform text mining, one is the case in which a text is written to describe one concept using a single word, and another is the case in which a text is written to describe the same concept using a plurality of words representing identical contents. Further, when a text describes one concept using a plurality of words semantically associated with each other, one structure can be extracted as a whole for the concept.

Next, specific example of operation will be explained for the text mining device 30.

In this exemplary embodiment, the association node extraction unit 22 extracts nodes in a same surface, nodes in a synonymous relationship designated by a user, and nodes in a relationship of related words designated by the user, as the association nodes.

As in the case of the second operation example of the text mining device 10, assuming that the texts from S4 to S9 shown in FIG. 13 are stored in the text DB 11.

The language analysis unit 21 parses each text of the text collection shown in FIG. 13 within the text DB 11, and obtains sentence structures of each text (Step A1 in FIG. 20), where sentence structures become ones as shown in FIG. 14.

The association node extraction unit 22 extracts semantically associated nodes from each of those sentence structures shown in FIG. 14 (Step A2 in FIG. 20).

From the text S4, "keijidosha (minicars)" and "keijidosha (minicars)" of the structure T4 which in a same surface are extracted as the association nodes.

From the text S5, "keijidosha (minicars)" of the structure T5-A and "keijidosha (minicars)" of the structure T5-B in a same surface are extracted as the association nodes.

From text S6, "keijidosha (minicars)" of the T6-A and "kei (mini)" of the T6-B in a synonymous relationship designated by a user are extracted as the association nodes. From the text S7, "jidosha (cars)" and "shasu C (C type of cars)" in the structure T7 in a relationship of related words with each other designated by the user are extracted as the association nodes.

From the text S8, "jidosha (cars)" of the structure T8-A and "shashu C (C type of cars)" of the structure T8 in a relationship of related words designated by the user are extracted as the association nodes.

From the text S9, "jidosha (cars)" of the structure T9-A and "shashu C (C type of cars)" of the structure T9-C in a relationship of related words designated by the user are extracted as the association nodes.

The operation so far is a same as in the case of the text mining device 10.

The semantic association level calculation unit 25 receives information on the association nodes in each sentence structure from the association node extraction unit 22, and calculates a semantic association level thereof, and then transmits information on the semantic association level of those association nodes in each sentence structure to the unit 26 of association node joint by association level (Step B1 in FIG. 20).

Assuming that the semantic association level of association nodes in a same surface is 4, the level of nodes in a synonymous relationship designated by a user is 3, and the level of nodes in a relationship of related words designated by the user is 1, for example.

The semantic association levels of those association nodes in each sentence structure shown in FIG. 14 are calculated as; 4 for "keijidosha (minicars)" and "keijidosha (minicars)" of the structure 4 in the relationship of the same surface; 4 for "keijidosha (minicars)" of the structure T5-A and "keijidosha (minicars)" of the structure T5-B in the relationship of the same surface; 3 for "keijidosha (minicars)" of the structure T6-A and "kei (mini)" of the structure T6-B in the synonymous relationship designated by the user; 1 for "jidosha (cars)" and "shashu C (C type of cars)" of the structure T7 in the relationship of related words designated by the user; 1 for "jidosha (cars)" of the structure T8-A and "shashu C (C type of cars)" of the structure T8-B in the relationship of related words designated by the user; and 1 for "jidosha (cars)" of the structure T9-A and "shashu C (C type of cars)" of the structure T9-B in the relationship of related words designated by the user.

The input device 5 receives two thresholds as inputs, the thresholds A and B, to categorize association nodes in accordance with semantic association levels of those association nodes, and transmits them to the unit 26 of association node joint by association level (Step B2 in FIG. 20). Assuming that 2 is inputted as the threshold A, and 5 is inputted as the threshold B.

The unit 26 of association node joint by association level receives information on a collection of sentence structures, association nodes, and semantic association levels of those association nodes from the semantic association level calculation unit 25, in addition, it receives the thresholds A and B from the input device 5, and transforms each sentence structure in accordance with magnitude relation among the value of the semantic association level of association nodes, the thresholds A and B (Step B3 in FIG. 20).

FIG. 21 shows transformed sentence structures obtained by the association node joint unit 26.

In the structure T4 of FIG. 14, the pair of association nodes, "keijidosha (minicars)" and "keijidosha (minicars)", is in the semantic association level 4, which is equal to the threshold A or more, as well as under the threshold B, therefore, these nodes are connected by a semantic association branch (illustrated with dotted lines in FIG. 21) to be a structure T4" in FIG. 21. This semantic association branch is distinguished from a branch indicating a dependent relationship in a sentence structure during a characteristic structure extraction processing.

In the structures T5-A and T5-B of FIG. 14, the pair of association nodes "keijidosha (minicars)" of the structure T5-A and "keijidosha (minicars)" of the structure T5-B is in the semantic association level 4, which is equal to the threshold A or more, as well as under the threshold B, therefore, these nodes are connected by a semantic association branch to be a structure T5" in FIG. 21.

In the structures T6-A and T6-B in FIG. 14, the pair of association nodes, "keijidosha (minicars)" of the structure T6-A and "kei (mini)" of the structure T6-B is in the semantic association level 3, which is equal to the threshold A or more, as well as under the threshold B, therefore, these nodes are connected by a semantic association branch to be a structure T6" in FIG. 21.

In the structure T7 in FIG. 14, the pair of association nodes, "jidosha (cars)" and "shashu C (C type of cars)" is in the semantic association level 1, which is under the threshold A, therefore, there is no transformation in the structure so as to be a structure T7" in FIG. 21.

In the structures T8-A and T8-B in FIG. 14, the pair of association nodes, "jidosha (cars)" of the structure T8-A and "shashu C (C type of cars)" of the structure T8-B is in the semantic association level 1, which is under the threshold A, therefore, there is no transformation in those structure, so that the structures become T8"-A and T8"-B in FIG. 21.

In the structures T9-A and T9-B of FIG. 14, the pair of association nodes, "jidosha (cars)" of the structure T9-A and "shashu C (C type of cars)" of the structure T9-B is in the semantic association level 1, which is under the threshold A, therefore, there is no transformation in those structures, so that the structures become T9"-A and T9"-B in FIG. 21.

The characteristic structure extraction unit 24 extracts a characteristic structure from a collection of the transformed sentence structure shown in FIG. 21 (Step A4 in FIG. 20).

However, a structure in which at least one of either of nodes connected by a semantic association branch with each other by the association node joint unit 26 is not connected to any other node by a dependency branch is unnecessary in the present invention, therefore, such a structure is not extracted as a characteristic structure. Excluding the above case, a partial structure appearing 3 times or more is extracted as a characteristic structure. Referring to FIG. 21, paying attention at a same time on a case where "keijdosha (minicars)" and "kei (mini)" are handled as identical words in accordance with the synonyms designated by the user, extracted frequent partial structures are to be frequent partial structures from PT7 to PT22 in FIG. 22.

Finally, those characteristic structures extracted as above are outputted to the output device 3 (Step A5 in FIG. 20).

Comparing the collection of characteristic structures in the case of the text mining device 10 shown in FIG. 17 to the collection of the characteristic structures in the case of the text mining device 30 shown in FIG. 22, the frequent partial structure T23 in FIG. 17 is obtained by joint of those association nodes in the related words designated by the user using the semantic association branch in the case of the text mining device 10, however, it is not extracted in the other case.

According to the text mining device 30, the unit 26 of association node joint by association level transforms a sentence structure by joint of association nodes in accordance with magnitude relation among a semantic association level of association nodes calculated by the semantic association level calculation unit 25 and a threshold inputted by a user, therefore, the user can coordinate text mining by joint of association nodes in accordance with strength of semantic association of those nodes.

The operation of the text mining device 10 shown in FIG. 8 can be realized by a computer and a computer program. FIG. 23 is a diagram showing such an exemplary embodiment.

A computer 40 in FIG. 23 includes a storage device 1, an output device 3, an input device 5, a CPU (Central Processing Unit) 6, and a main storage device 9. The storage device 1 is such as a hard disc device, and stores the text data base 11. The main storage device 9 is configured with such as a RAM (Random Access Memory), and stores a program 7 for text mining. The text mining program 7 is a program to make the CPU 6 execute the aforementioned operation of the text mining device 10. The text mining program 7 is read in by the CUP 6 so as to be executed.

According to the above, the CPU 6 can work as the language analysis unit 21, the association node extraction unit 22, the association node joint unit 23, and the characteristic structure extraction unit 24, so that the computer 40 can operate as the text mining device 10.

By the same token, the CPU 6 may work as the language analysis unit 21, the association node extraction unit 22, the semantic association level calculation unit 25, the unit 26 of association node joint by association level, and the characteristic structure extraction unit 24, so that the computer 40 may operate as the text mining device 30.

Hereinbefore, the text mining device taking a text collection as an input data and the operation thereof have been explained as exemplary embodiments and specific examples of operations of the present invention. The present invention can be also applied to other data processing than the text mining, such as text briefing, text search, text classification, text mining for which a voice-recognition result is taken as an input.

BRIEF EXPLANATION OF DRAWINGS

FIG. 9 An example showing a text collection in a text DB;

DESCRIPTIONS OF CODES

Figure 1:
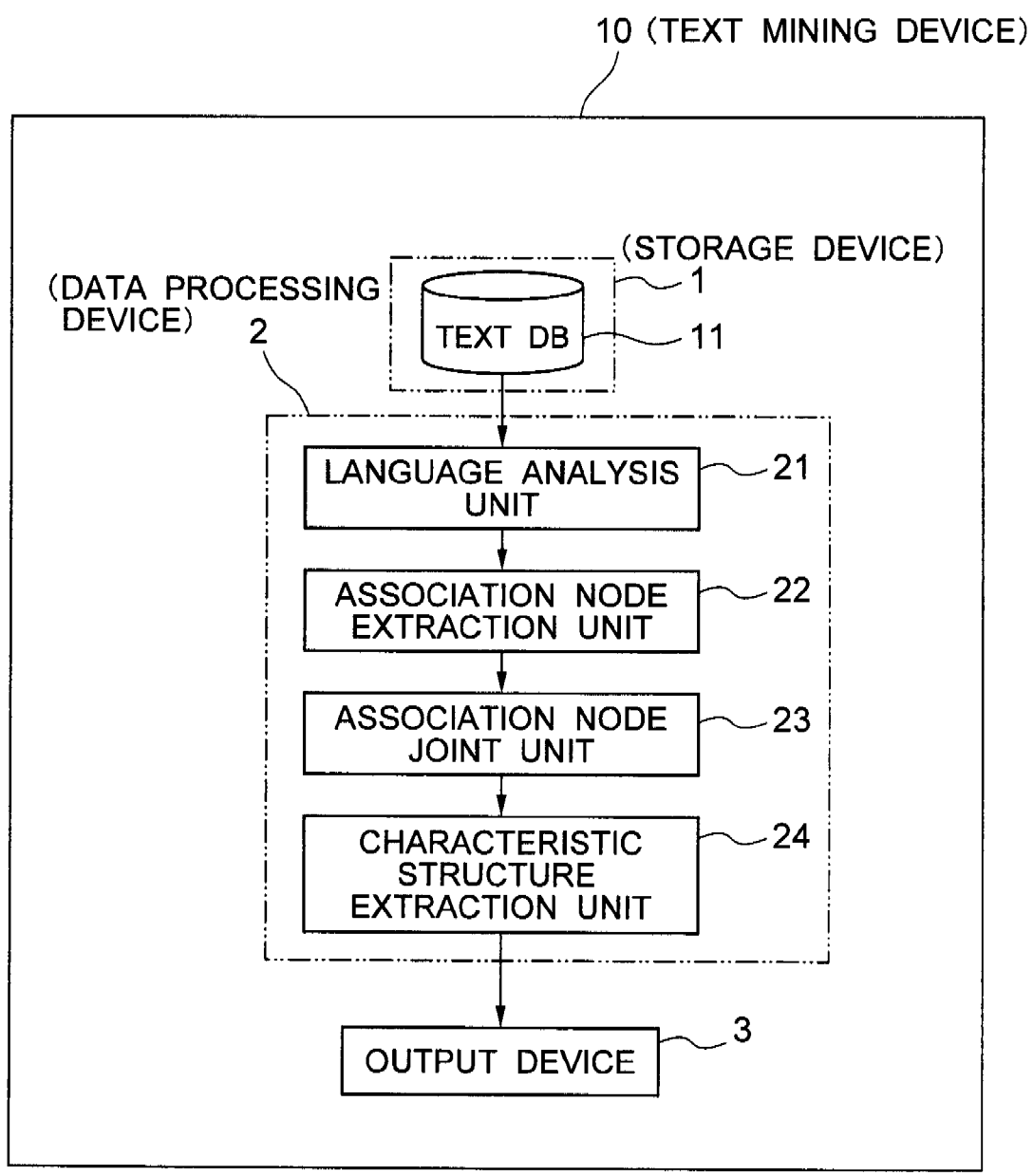
FIG. 1 A block diagram showing the configuration of a text mining device which is a first exemplary embodiment of the present invention.
Figure 2:
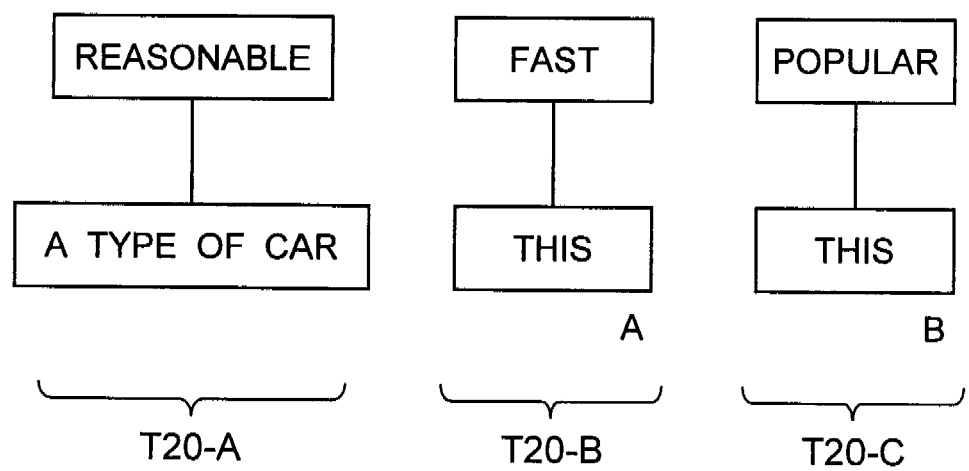
FIG. 2 A diagram showing an example in which there is a plurality of association node sets to be joined into one node, in addition, in which some node is included in the plurality of association node sets.
Figure 3:
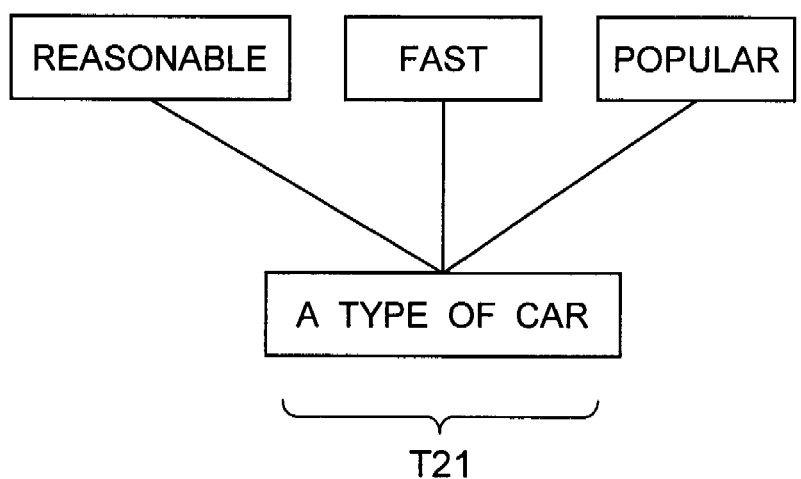
FIG. 3 A diagram showing a sentence structure after joint of those association nodes in the sentence structures in FIG. 2.
Figure 4:
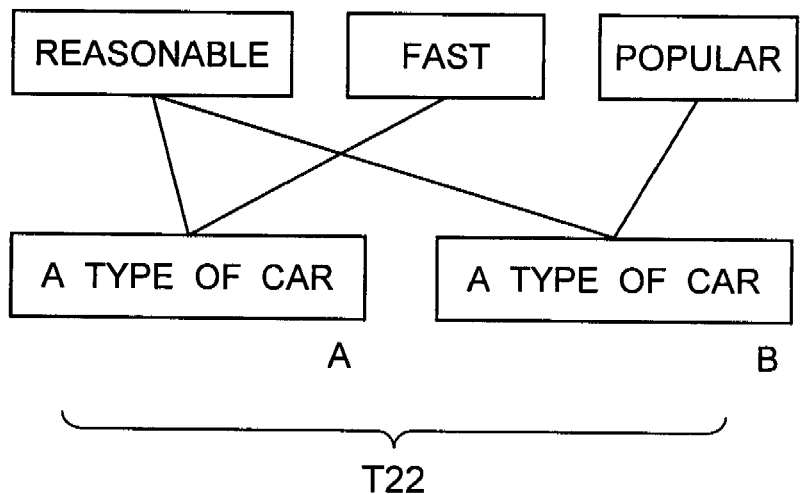
FIG. 4 A diagram showing a sentence structure after joint of those association nodes in the sentence structures in FIG. 2.
Figure 5:
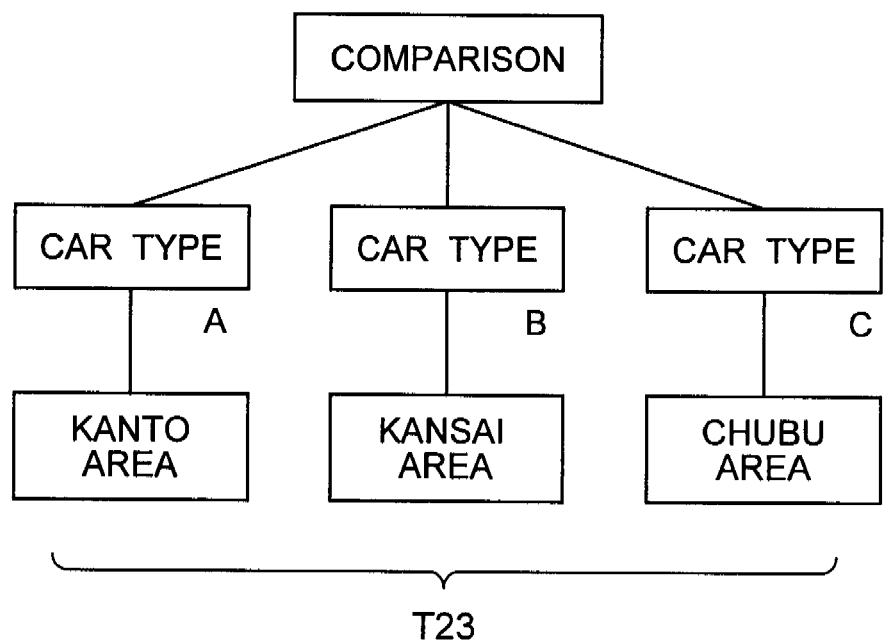
FIG. 5 A diagram showing an example of a sentence structure in which there is a plurality of association node sets to be connected by a semantic association branch, in addition, in which some node is included in the plurality of association node sets.
Figure 6:
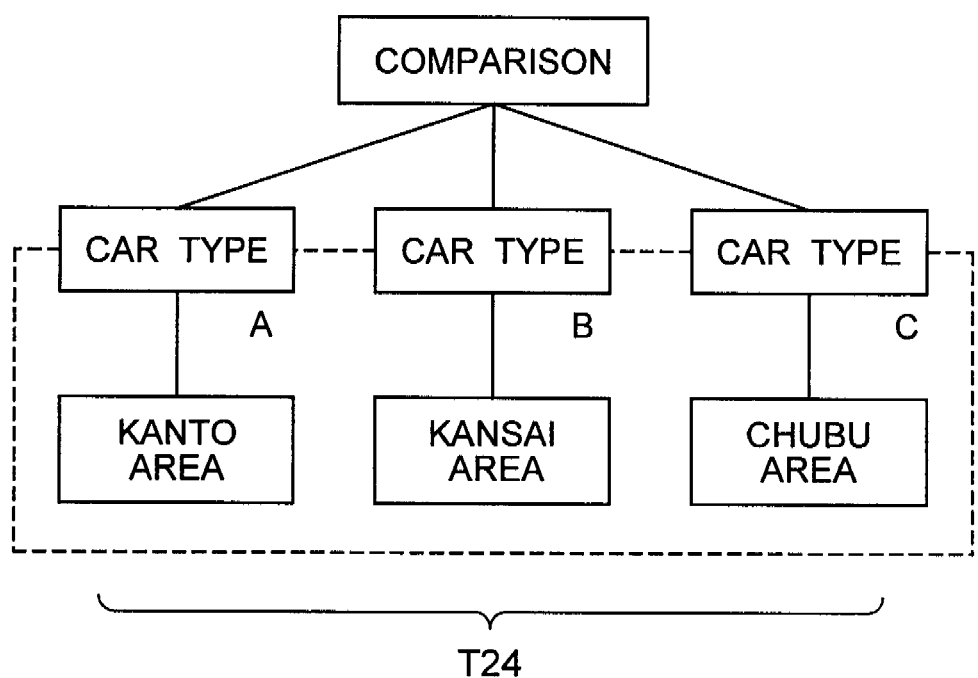
FIG. 6 A diagram showing a sentence structure after the sentence structure in FIG. 5 has had its association nodes joined.
Figure 7:
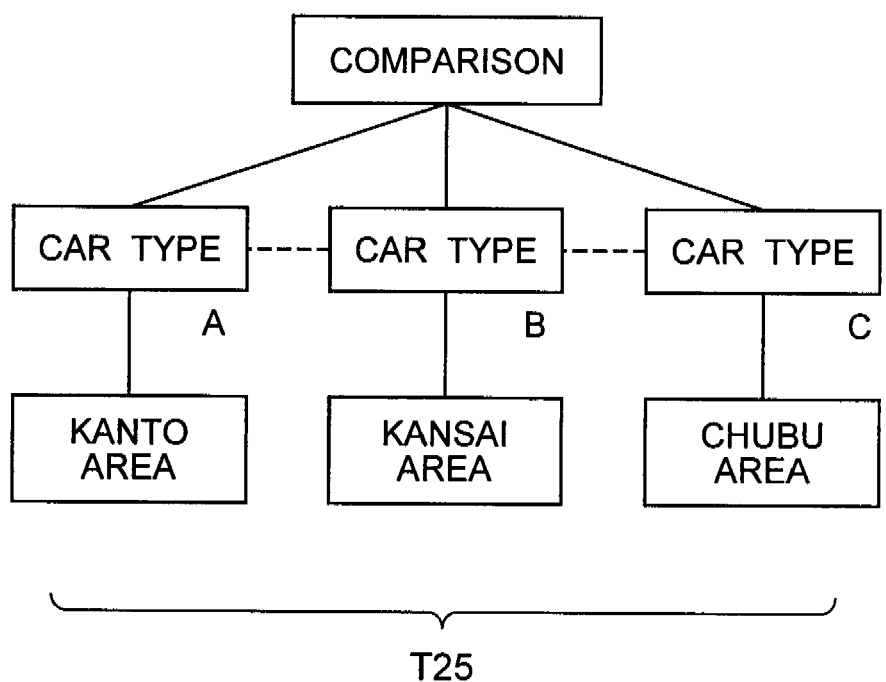
FIG. 7 A diagram showing a sentence structure after the sentence structure in FIG. 5 has had its association nodes joined.
Figure 8:
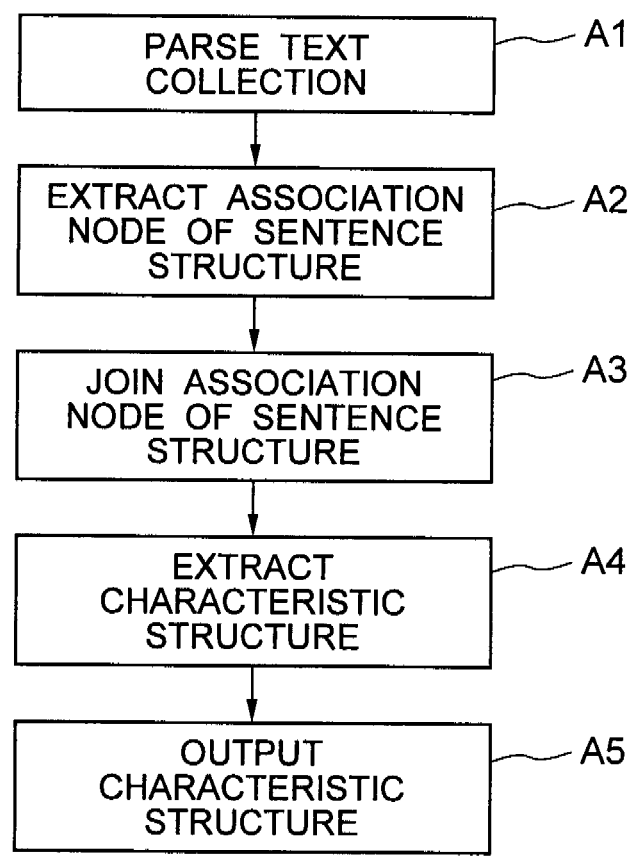
FIG. 8 A flowchart showing the operation of the text mining device in FIG. 1.
Figure 10:
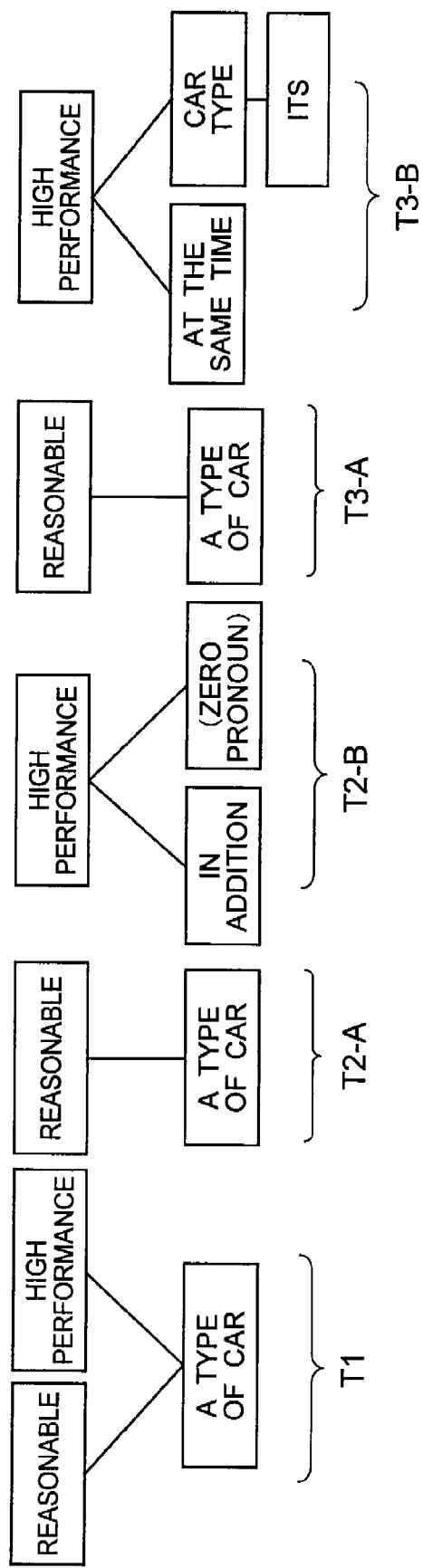
FIG. 10 A diagram showing a collection of sentence structures obtained in accordance with texts in the collection in FIG. 9 parsed by a language analysis unit.
Figure 11:
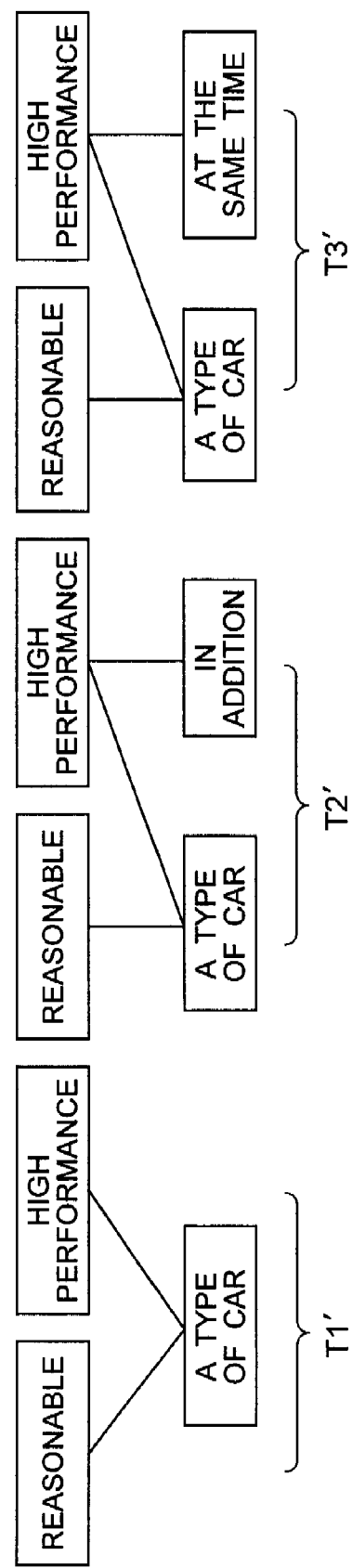
FIG. 11 A diagram showing a collection of transformed sentence structures obtained by application of transformation performed by an association node joint unit to the collection of sentence structures shown in FIG. 10.
Figure 12:
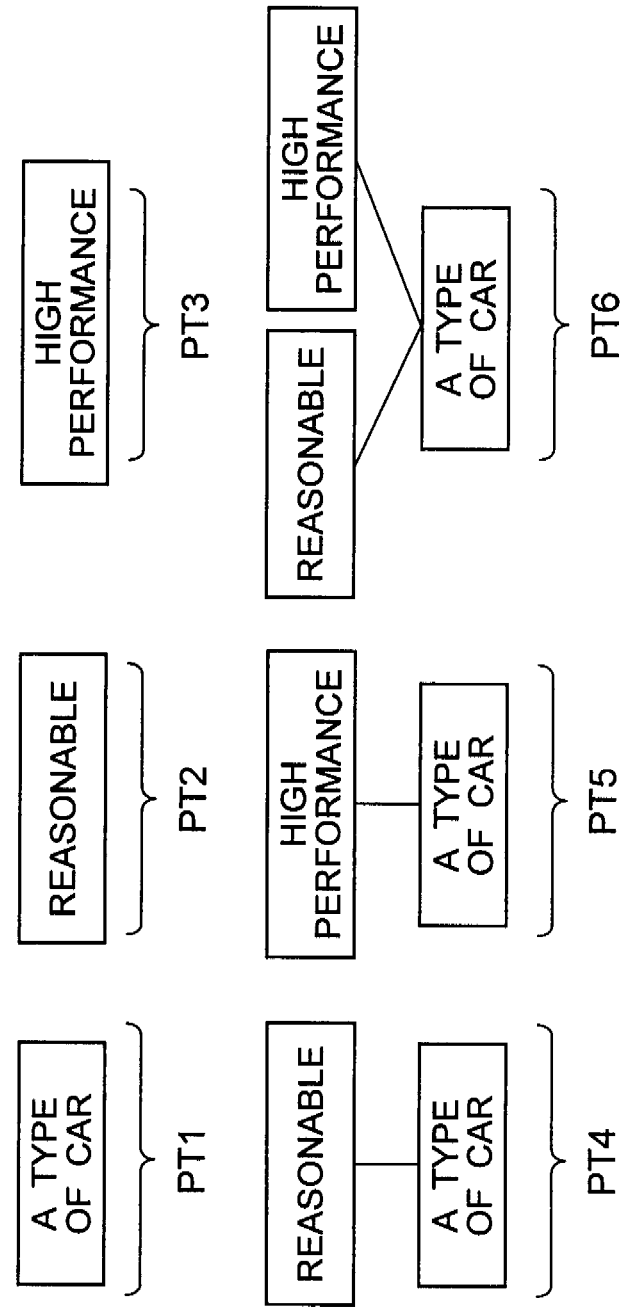
FIG. 12 A diagram showing characteristic structures extracted from the collection of transformed sentence structures shown in FIG. 11 by a characteristic extraction unit.
Figure 13:
FIG. 13 An example showing a text collection in the text DB 11.
Figure 14:
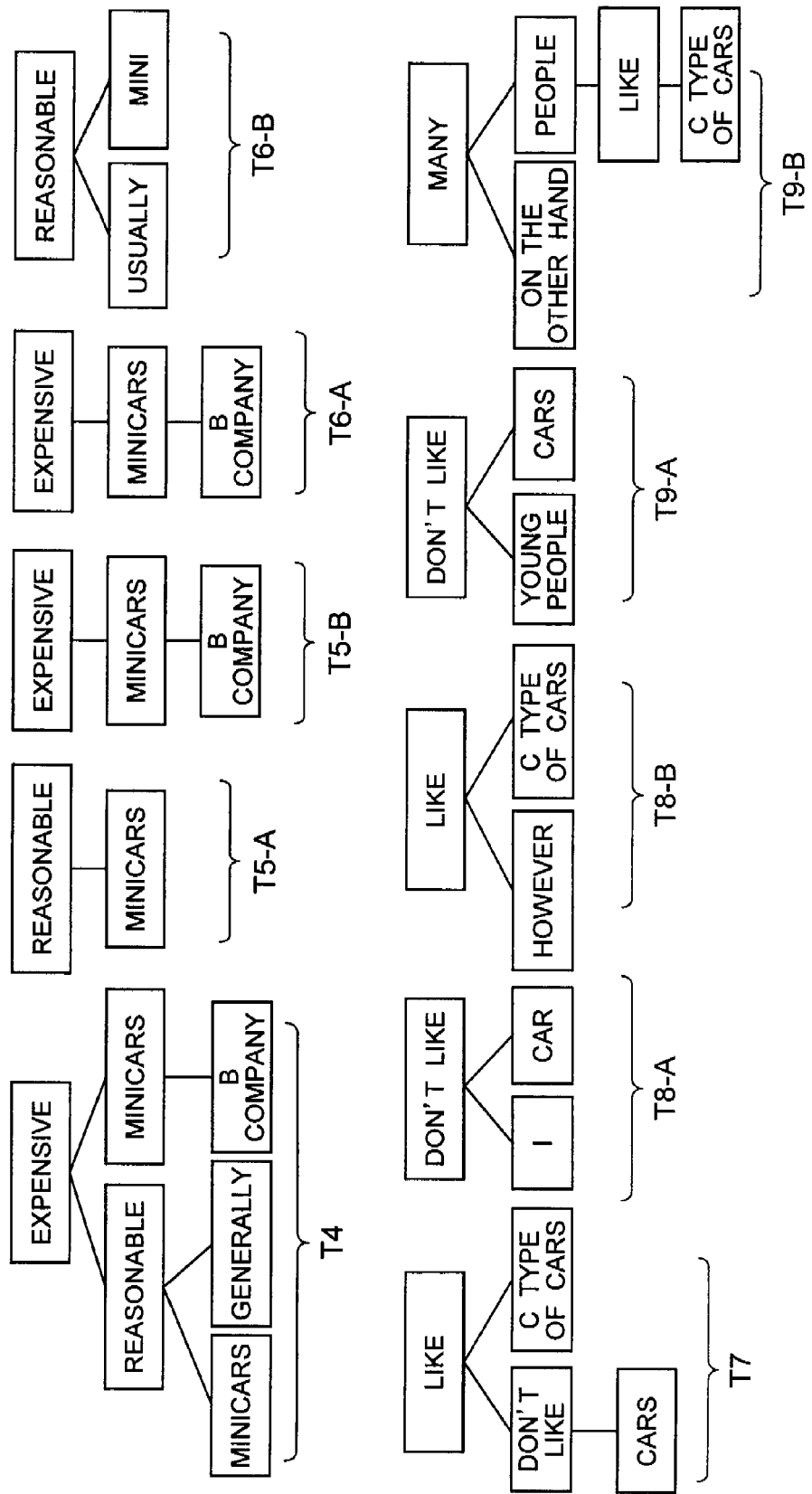
FIG. 14 A diagram showing a collection of sentence structures obtained by parsing texts of the collection in FIG. 13 by the language analysis unit.
Figure 15:
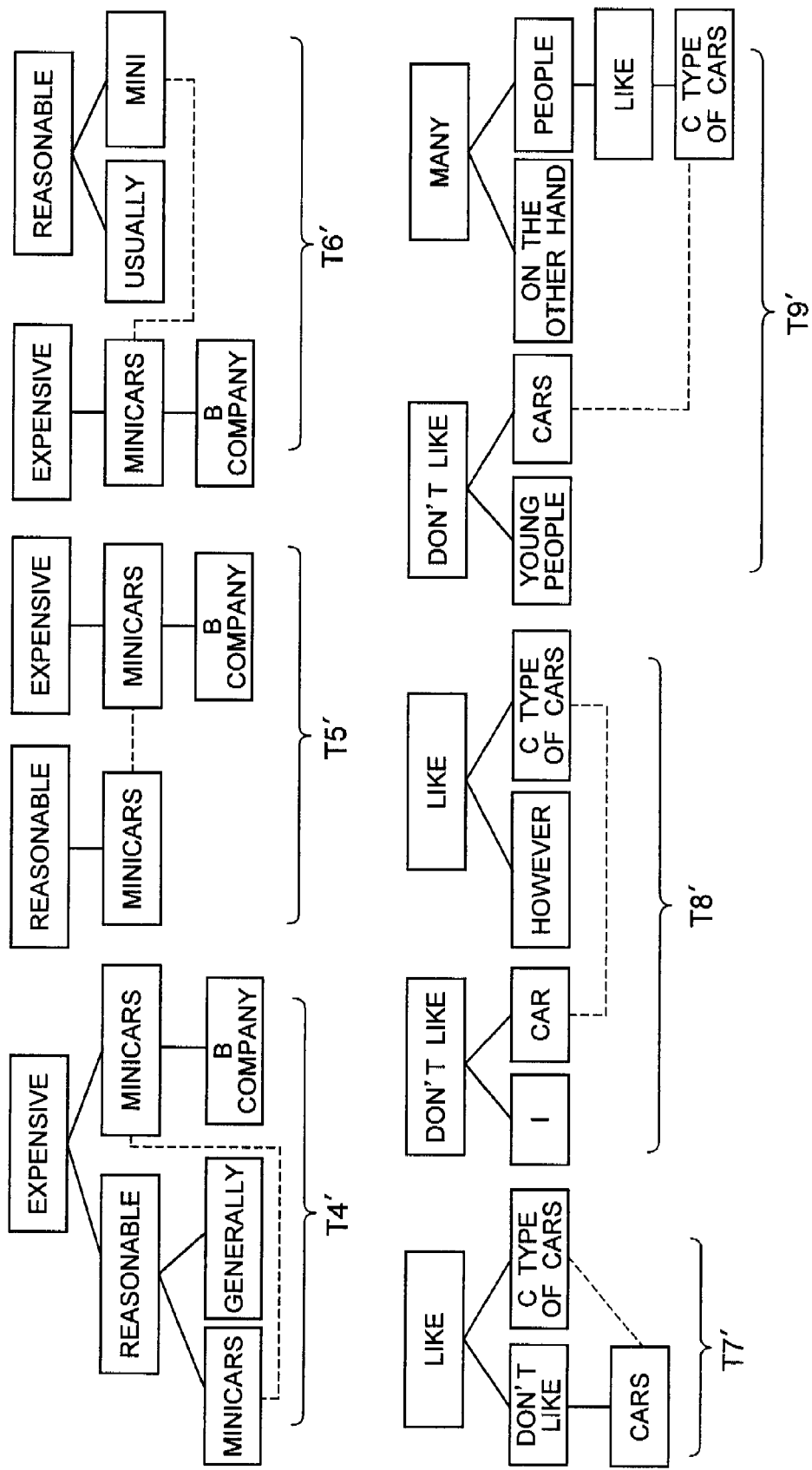
FIG. 15 A diagram showing a collection of transformed sentence structures obtained by application of transformation performed by an association node joint unit for the collection of sentence structures shown in FIG. 14.
Figure 16:
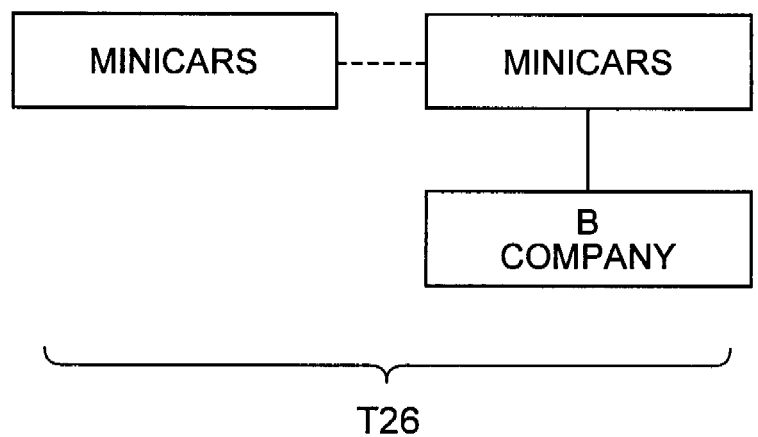
FIG. 16 A diagram showing a partial structure which is not extracted as a characteristic structure because a node connected by a semantic association branch is not connected with any node by a dependency branch.
Figure 17:
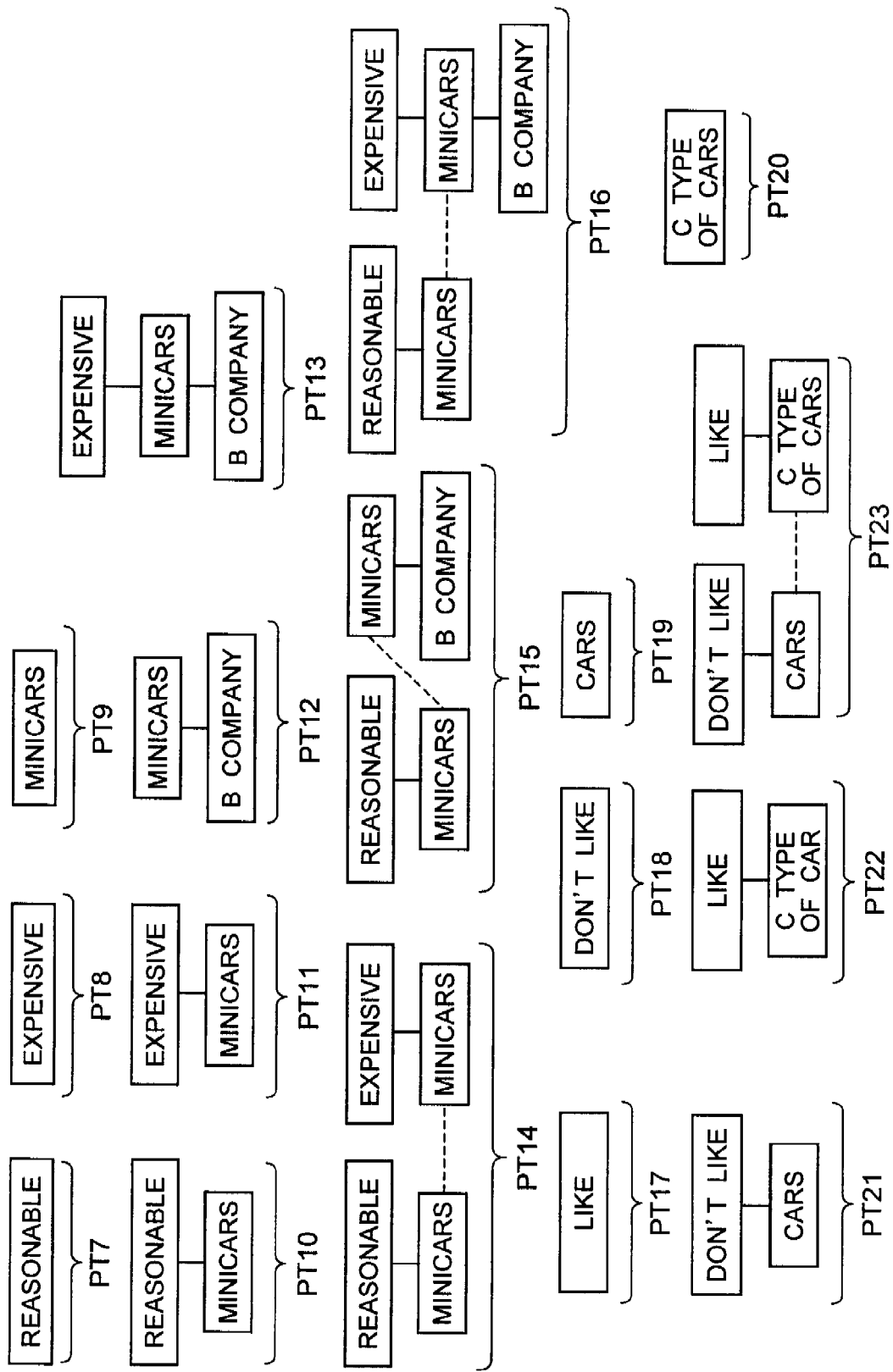
FIG. 17 A diagram showing characteristic structures extracted from the collection of transformed sentence structures shown in FIG. 15.
Figure 18:
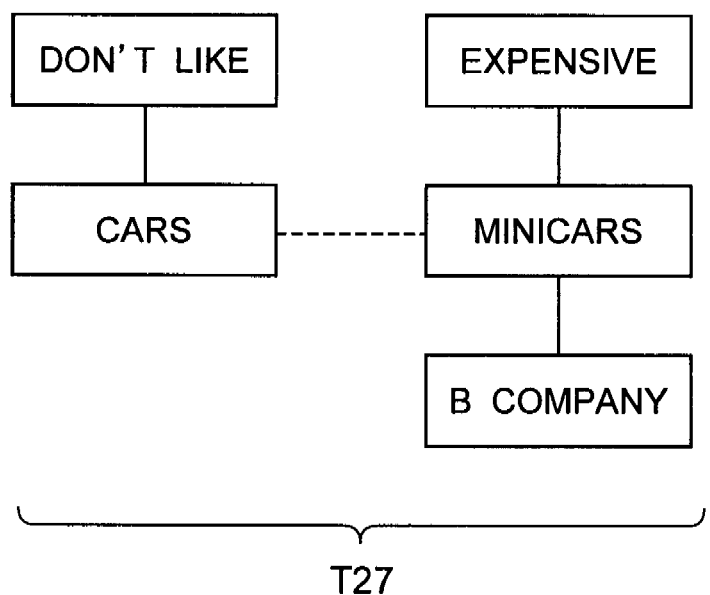
FIG. 18 A diagram showing a structure which can be obtained by joint of association nodes within the sentence structures shown in FIG. 14 using the semantic association branch, on the other hand, which is not extracted actually.
Figure 19:
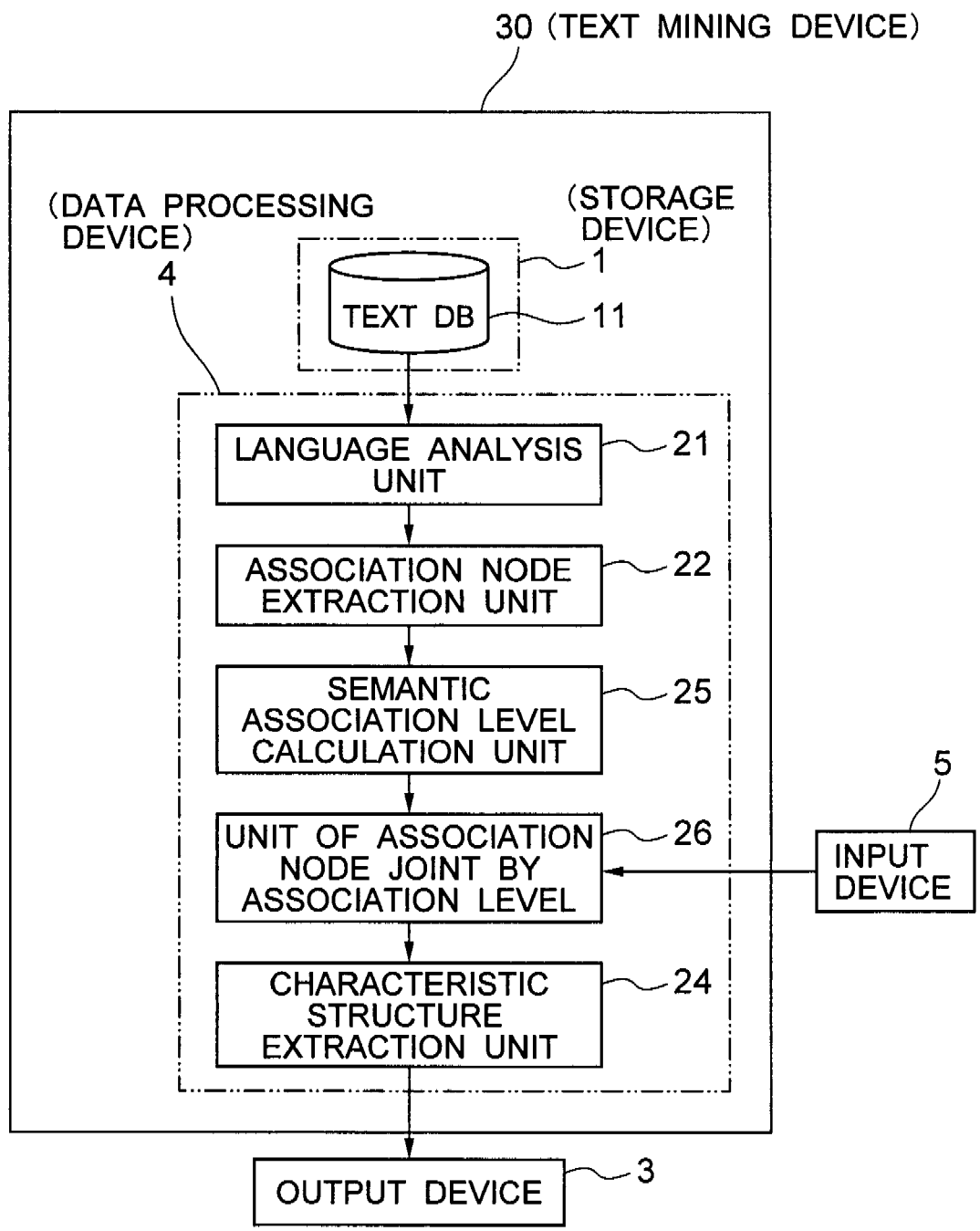
FIG. 19 A block diagram showing the configuration of a text mining device which is a second exemplary embodiment of the present invention.
Figure 20:
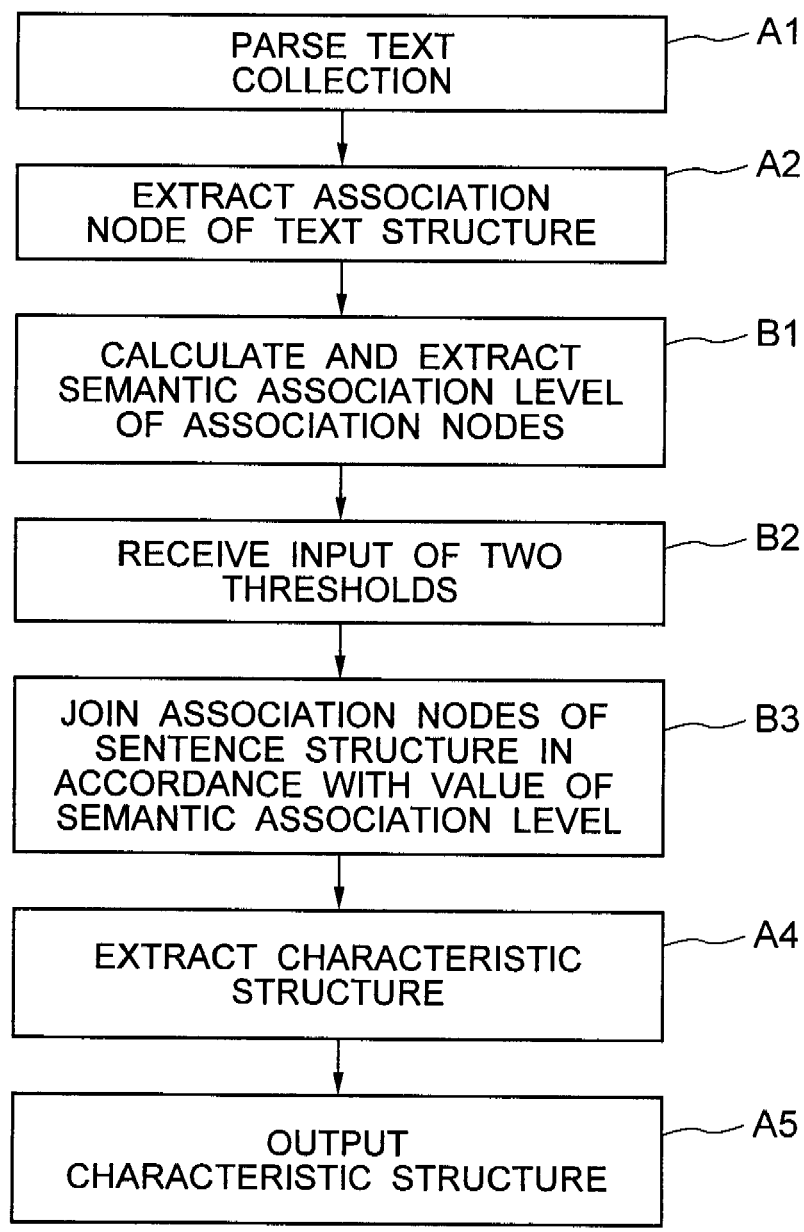
FIG. 20 A flowchart showing the operation of the text mining device in FIG. 19.
Figure 21:
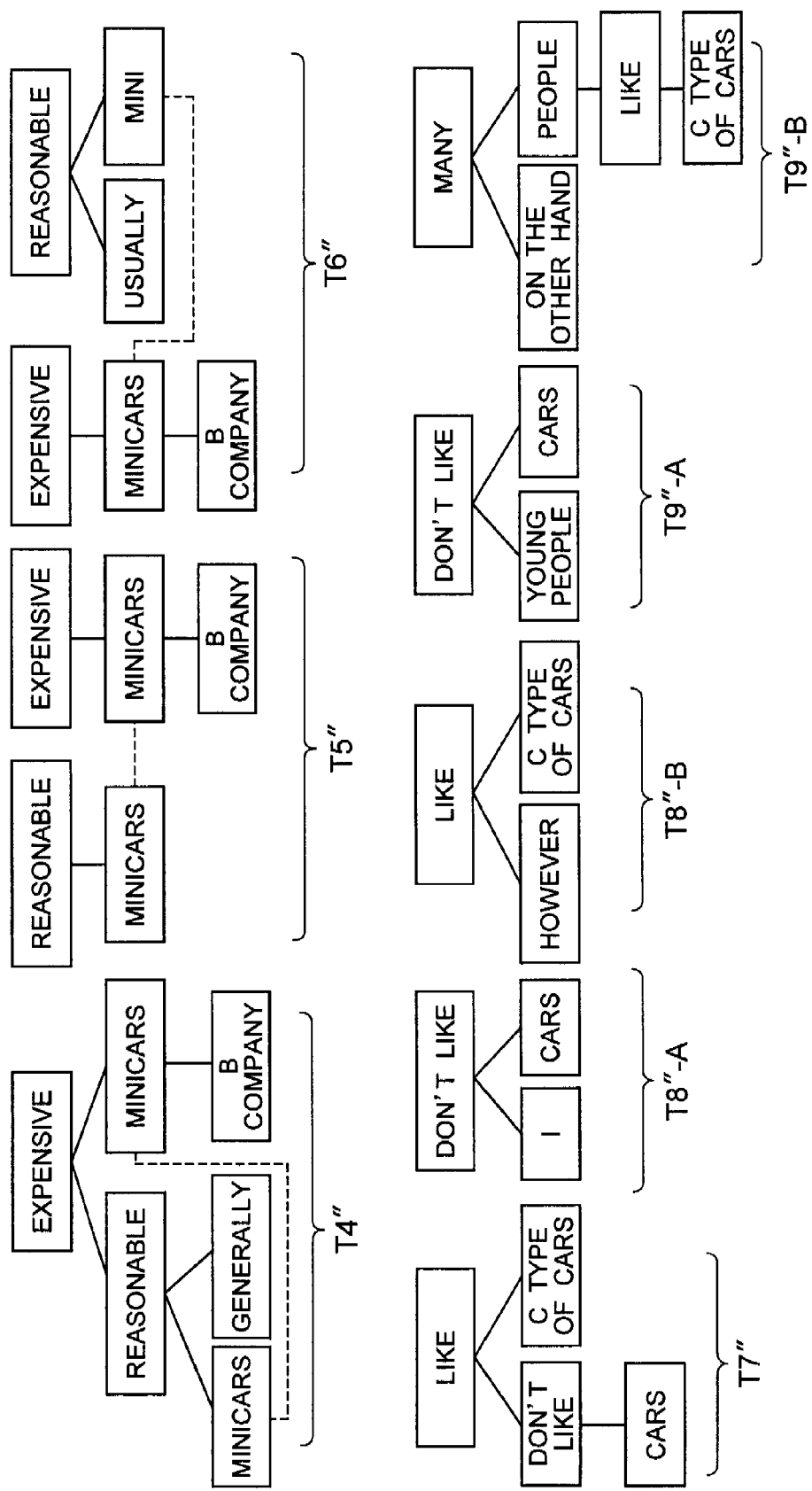
FIG. 21 A diagram showing a collection of transformed sentence structures obtained in accordance with application of transformation performed by a unit of association node joint by association level for the collection of sentence structures shown in FIG. 14.
Figure 22:
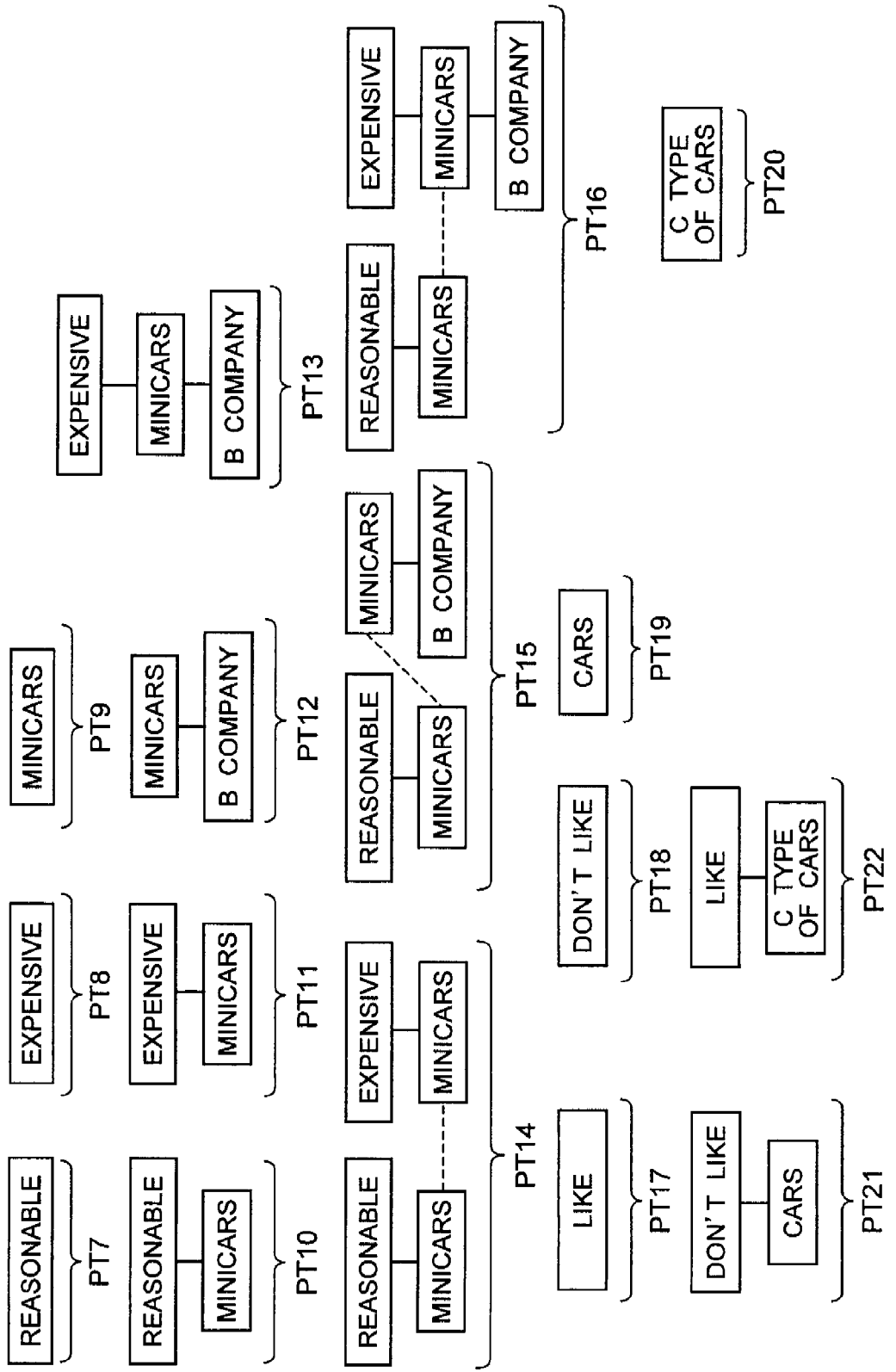
FIG. 22 A diagram showing characteristic structures extracted form the collection of transformed sentence structures shown in FIG. 21.
Figure 23:
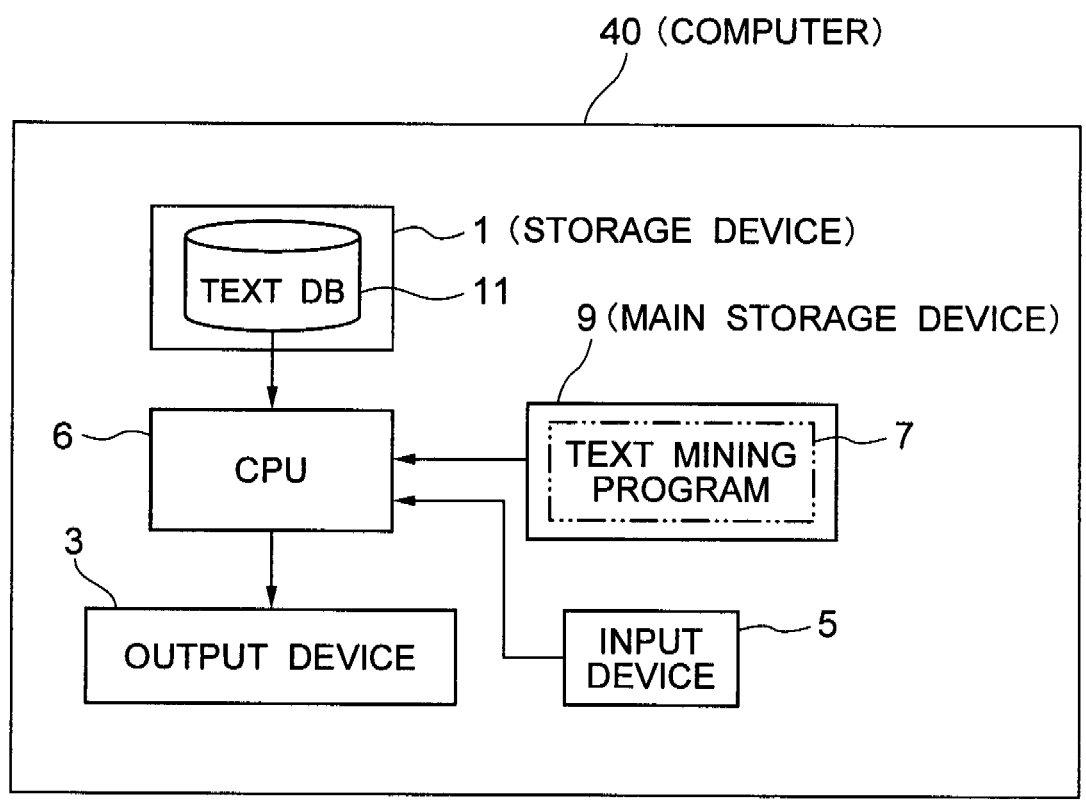
FIG. 23 A diagram illustrating the operation of a text mining program of the present invention.
Figure 24:
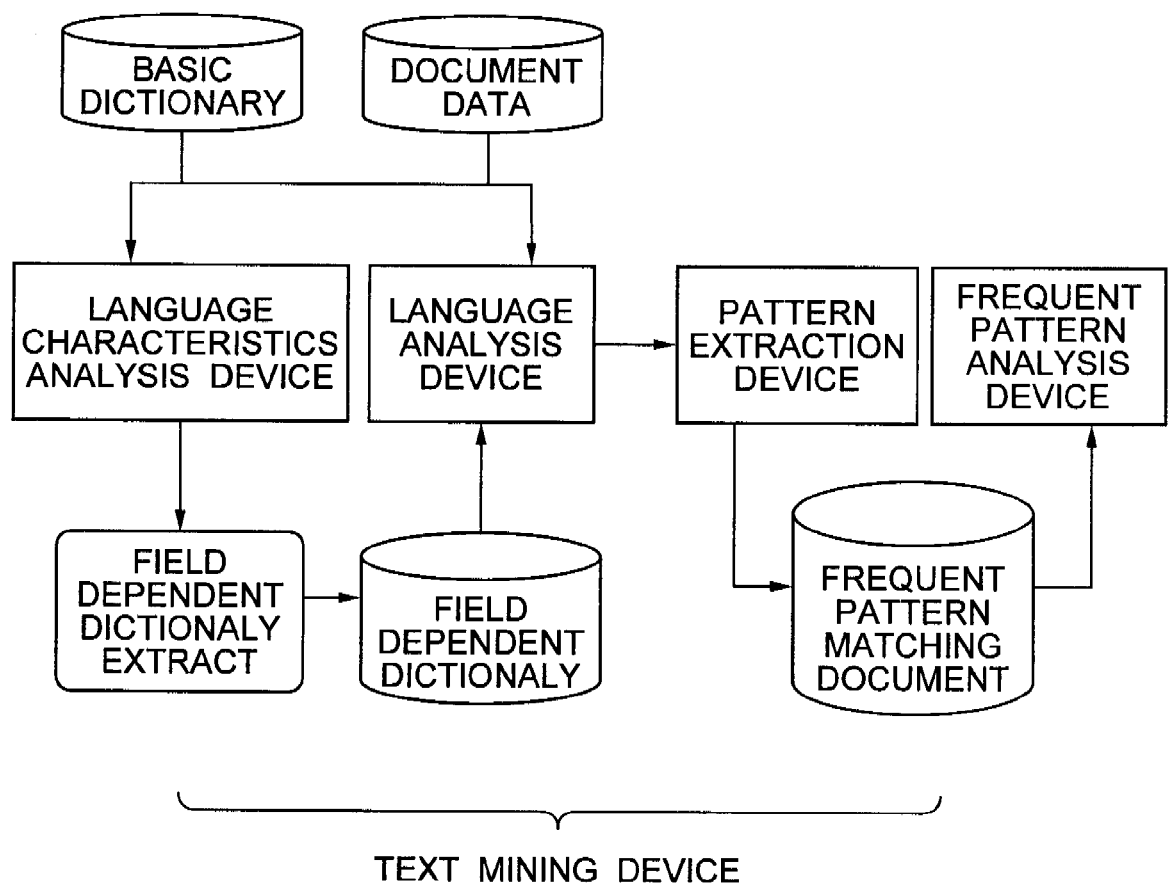
FIG. 24 A block diagram showing the configuration of a conventional text mining device.
Figure 25A:
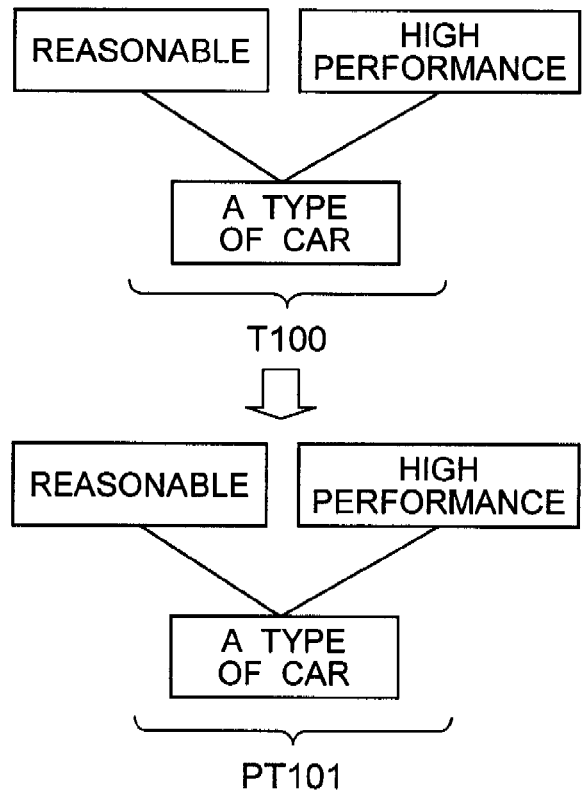
FIG. 25 A diagram showing examples of texts from which characteristic structures cannot be extracted appropriately with a conventional technique.
Figure 25B:
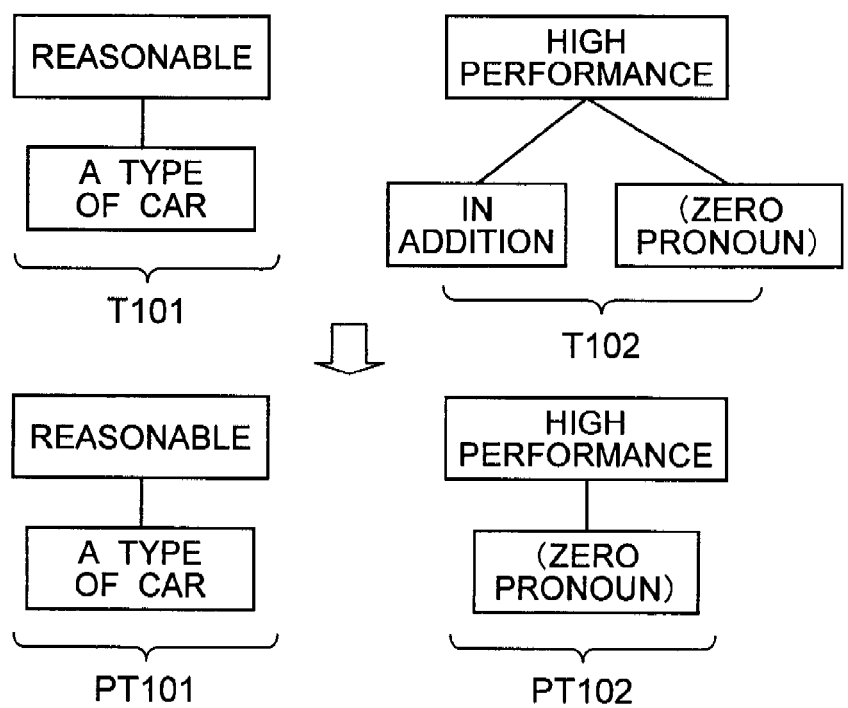
Figure 26:
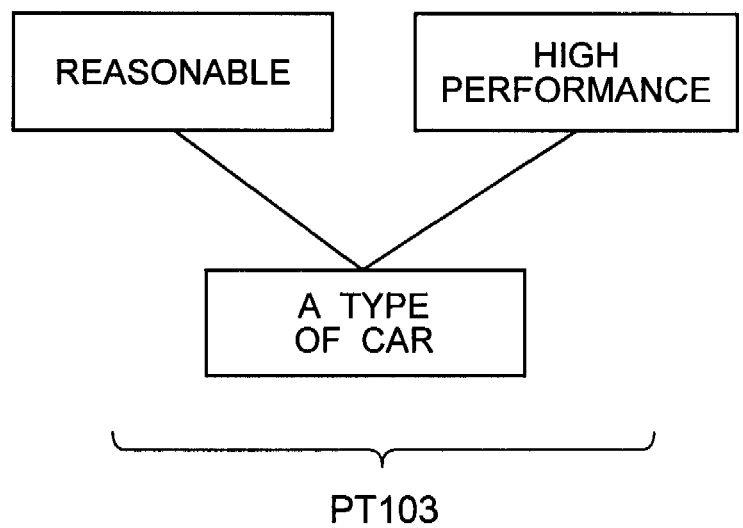
FIG. 26 A diagram showing an example of a characteristic structure which is desired to be extracted from the text of the examples in FIG. 25.
Figure 27A:
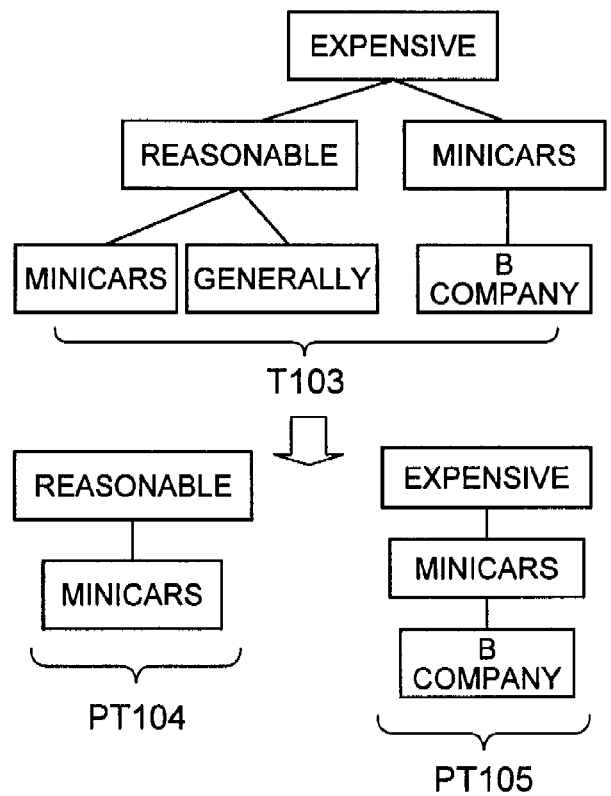
FIG. 27 A diagram showing examples of texts from which concepts thereof cannot be extracted in a single structure as a whole with the conventional technique.
Figure 27B:
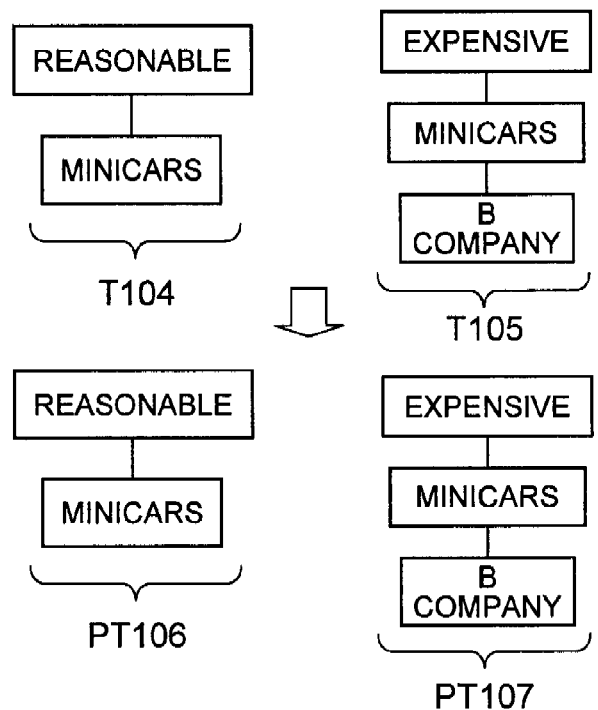
Figure 28:
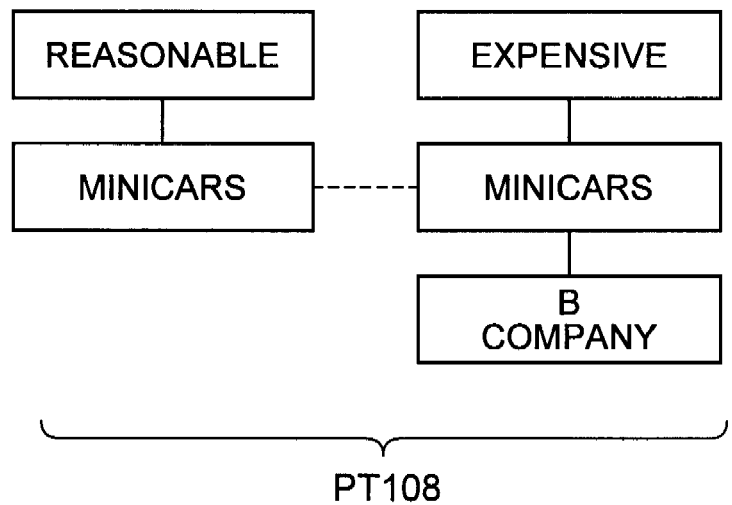
FIG. 28 A diagram showing an example of a characteristic structure which is desired to be extracted from two of the texts in those examples of FIG. 27.

7 TEXT MINING PROGRAM
10, 30 TEXT MINING DEVICE
40 COMPUTER
11 TEXT DB
22 ASSOCIATION NODE EXTRACTION UNIT
23 ASSOCIATION NODE JOINT UNIT
24 CHARACTERISTIC STRUCTURE EXTRACTION UNIT
25 SEMANTIC ASSOCIATION LEVEL CALCULATION UNIT
26 UNIT OF ASSOCIATION NODE JOINT BY ASSOCIATION LEVEL (ASSOCIATION NODE JOINT UNIT)

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2005-227283, filed on Aug. 4, 2005, the disclosure of which is incorporated herein in its entirety by reference.

The invention claimed is:

1. A data processing device generating a graph which expresses an input data structure by a plurality of nodes having a single word as content thereof and by a dependency branch connecting two nodes in a dependent relationship within the plurality of nodes, and extracting a characteristic structure characterizing the input data from the graph, the device comprising:

an association node extraction unit for extracting nodes semantically associated with each other, which are nodes corresponding to words representing same or similar content, from each of sentence structures in a given sentence structure collection, and outputting information on the sentence collection and association nodes in each of the sentence structures;

an association node joint unit for joining the nodes semantically associated with each other in each of the sentence structures by a semantic association branch based on the information on the sentence structure collection to newly generate a structure that expresses a concept which is not present, but implied, in each original sentence structure, and the association nodes in each of the sentence structures received from the association node extraction unit so as to transform each of the sentence structures in the sentence structure collection, and outputting a structure collection obtained by the transformation; and a characteristic structure extraction unit for extracting a characteristic partial structure based on the sentence structure collection transformed by joining the semantic association branch received from the association node joint unit, wherein the characteristic structure extraction unit performs characteristic structure extraction processing by distinguishing a branch indicating a dependent relationship in the graph structure from the semantic association branch.

2. The data processing device, as claimed in claim 1, wherein the association node joint unit has a function of categorizing the association nodes into strong association nodes which are in a strong semantic association and weak association nodes which are in a weak semantic association, and a function of joining the strong association nodes into one node.

3. The data processing device, as claimed in claim 2, wherein the association node joint unit has a function of connecting the weak association nodes by a semantic association branch, and the characteristic structure extraction unit has a function in which a partial structure of the graph is not extracted as the characteristic structure when the partial structure includes nodes connected by the semantic association branch, in addition, at least one of those nodes is not connected with another node by the dependency branch.

4. The data processing device, as claimed in claim 3, wherein the association node extraction unit has an anaphoric nodes extracting function of extracting anaphoric nodes including a pronoun or a zero pronoun, and an antecedent in an anaphoric relationship, as the association node, and the association node joint unit has a function of node categorization for categorizing the anaphoric nodes as the strong association node.

5. The data processing device, as claimed in claim 3, wherein the association node extraction unit has a function of same surface node extraction for extracting same surface nodes including words in the same surface as the association nodes, and the association node joint unit has a function of node categorization for categorizing the same surface nodes as the weak association nodes.

6. The data processing device, as claimed in claim 3, wherein the association node extraction unit has a function of synonymous node extraction for extracting synonymous nodes including words regarded as synonyms in a thesaurus as the association nodes, and the association node joint unit has a function of node categorization for categorizing the synonymous nodes into the weak association nodes.

7. The data processing device, as claimed in claim 3, wherein the association node extraction unit has a function of designated synonymous node extraction for extracting designated synonymous nodes including synonyms designated by a user as the association nodes, and the association node joint unit has a function of node categorization for categorizing the designated synonymous nodes as the weak association nodes.

8. The data processing device, as claimed in claim 3, wherein the association node extraction unit has a function of related word node extraction for extracting related word nodes including words regarded as related words in a thesaurus as the association nodes, the association node joint unit has a function of node categorization for categorizing the related word nodes into the weak association nodes.

9. The data processing device, as claimed in claim 3, wherein the association node extraction unit has a function of designated related word node extraction for extracting designated related word nodes including related words designated by a user as the association nodes, the association node joint unit has a function of node categorization for categorizing the designated related word nodes as the weak association nodes.

10. The data processing device, as claimed in claim 2, comprising:

a semantic association level calculation unit for calculating a semantic association level which indicates strength of semantic association between words included in the association nodes; wherein the association node joint unit categorizes the association nodes into the strong association nodes and the weak association nodes based on the semantic association level.

11. The data processing device, as claimed in claim 10, wherein the association node joint unit categorizes the association nodes, of which the semantic association level is less than a first threshold, as the weak association nodes, and categorizes the association nodes, of which the semantic association level is equal to the first threshold or more, into the strong association node.

12. The data processing device, as claimed in claim 11, wherein the association node joint unit does not join the association nodes of which the semantic association level is less than a second threshold.

13. A data processing means for generating a graph which expresses an input data structure by a plurality of nodes having a single word as content thereof and by a dependency branch connecting two nodes in a dependent relationship within the plurality of nodes, and extracting a characteristic structure characterizing the input data from the graph, the means comprising:

an association node extraction means for extracting nodes semantically associated with each other, which are nodes corresponding to words representing same or similar content, from each of sentence structures in a given sentence structure collection, and outputting information on the sentence structure collection and association nodes in each of the sentence structures;

an association node joint means for joining the nodes semantically associated with each other in each of the sentence structures by a semantic association branch based on the information on the sentence structure collection and the association nodes in each of the sentence structures received from the association node extraction means so as to transform each of the sentence structures in the sentence structure collection to newly generate a structure that expresses a concept which is not present, but implied, in each original sentence structure, and outputting a structure collection obtained by the transformation; and a characteristic structure extraction means for extracting a characteristic partial structure based on the sentence structure collection transformed by joining the semantic association branch received from the association node joint means, wherein the characteristic structure extraction means performs characteristic structure extraction processing by distinguishing a branch indicating a dependent relationship in the graph structure from the semantic association branch.

14. A data processing method generating a graph which expresses an input data structure by a plurality of nodes having a single word as content thereof and by a dependency branch which connects two nodes in a dependent relationship within the plurality of nodes, and extracting a characteristic structure characterizing the input data from the graph, the method comprising:

extracting nodes semantically associated with each other, which are nodes corresponding to words representing same or similar content, from each of sentence structures in a given sentence structure collection, and acquiring information on the sentence structure collection and association nodes in each of the sentence structures;

joining the nodes associated with each other in each of the sentence structures by a semantic association branch based on the acquired information on the sentence structure collection and the association nodes in each of the sentence structures so as to transform each of the sentence structures in the sentence structure collection to newly generate a structure that expresses a concept which is not present, but implied, in each original sentence structure, and acquiring the structure collection obtained by the transformation; and extracting a characteristic partial structure based on the acquired sentence structure collection transformed by joining the semantic association branch; and performing, characteristic structure extraction processing by distinguishing a branch indicating a dependent relationship in the graph structure from the semantic association branch during the characteristic structure extraction processing.

15. A non-transitory computer readable recording medium storing a data processing program which controls processing for generating a graph which expresses an input data structure by a plurality of nodes having a single word as content thereof and by a dependency branch connecting two modes in a dependent relationship within the plurality of nodes and extracting a characteristic structure characterizing the input data from the graph, the program making a computer execute the functions of:

extracting nodes semantically associated with each other, which are nodes corresponding to words representing same or similar content, from each of sentence structures in a given sentence structure collection, and acquiring information on the sentence structure collection and association nodes in each of the sentence structures;

joining the nodes semantically associated with each other in each of the sentence structures by a semantic association branch based on the acquired information on the sentence structure collection and the association nodes in each of the sentence structure so as to transform each of the sentence structures in the sentence structure collection to newly generate a structure that expresses a concept which is not present, but implied, in each original sentence structure, and acquiring the structure collection obtained by the transformation; and extracting a characteristic partial structure based on the acquired sentence structure collection transformed by joining the semantic association branch; and performing characteristic structure extraction processing by distinguishing a branch indicating a dependent relationship in the graph structure from the semantic association branch during the characteristic structure extraction processing.

* * * * *